(12) United States Patent
Muthukrishnan et al.

(10) Patent No.: US 12,443,478 B2
(45) Date of Patent: Oct. 14, 2025

(54) EXTRACTING DIAGNOSTIC METADATA TO IDENTIFY PROBLEMS IN ACCESS-RESTRICTED COMPUTING ENVIRONMENTS

(71) Applicant: Oracle International Corporation, Redwood Shores, CA (US)

(72) Inventors: Nagarajan Muthukrishnan, Redwood Shores, CA (US); Srikanth Nagandla, Santa Clara, CA (US); Yu Li, Redwood Shores, CA (US); Paul Hsu, Encinitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 94 days.

(21) Appl. No.: 18/414,142

(22) Filed: Jan. 16, 2024

(65) Prior Publication Data
US 2025/0231829 A1    Jul. 17, 2025

(51) Int. Cl.
*G06F 11/07* (2006.01)
*G06F 21/62* (2013.01)

(52) U.S. Cl.
CPC ........ *G06F 11/079* (2013.01); *G06F 11/0748* (2013.01); *G06F 21/62* (2013.01)

(58) Field of Classification Search
CPC ... G06F 21/62; G06F 21/6218; G06F 21/6236
See application file for complete search history.

(56) References Cited

U.S. PATENT DOCUMENTS

| 8,185,550 | B1 * | 5/2012 | Eichler | G06F 21/604 |
| | | | | 709/224 |
| 2017/0168881 | A1 * | 6/2017 | Memar-Zahedani | |
| | | | | G06F 11/079 |
| 2024/0289201 | A1 * | 8/2024 | Nagar | G06F 11/0751 |
| 2025/0165322 | A1 * | 5/2025 | Gagov | G06F 9/453 |

* cited by examiner

*Primary Examiner* — Gabriel Chu
(74) *Attorney, Agent, or Firm* — Mughal Gaudry & Franklin PC

(57) ABSTRACT

A computer system performs tasks in an access restricted environment. Data is logged in diagnostic files about logical resources in use by the computer system as the computer system attempts to perform the tasks. Occasionally, a problem may prevent the computer system from correctly performing a task. A machine authenticates a user in the access-restricted environment and receives error metadata to initiate an automated process for generating a troubleshooting signature. The automated process involves selecting a metadata extraction policy based on a category of error and using the metadata extraction policy to extract metadata from a diagnostic file. The extracted metadata is analyzed to determine troubleshooting components including the problem, a source of the problem, and/or a version of software that encountered the problem. These troubleshooting components are combined in the troubleshooting signature, which is consumed in a diagnostic tool environment that is separate from the access-restricted environment.

20 Claims, 10 Drawing Sheets

EXTRACTING DIAGNOSTIC METADATA TO IDENTIFY PROBLEMS IN ACCESS-RESTRICTED COMPUTING ENVIRONMENTS

BACKGROUND

Standard computer systems are connected to an Internet Service Provider, which connects the computer systems to the Internet for open communication with other computer systems on other networks. In scenarios where national security, highly valuable trade secrets or confidential information, or ground-breaking research are at stake, heightened security precautions are taken with respect to the computer systems managing valuable information. Firewalls filtering out untrusted communications may be sufficient to prevent many or all potentially harmful communications from reaching the computer systems managing the valuable information, while still allowing some trusted communications to remotely reach the computer systems. In some scenarios, even the most protective firewalls are not sufficient to ensure the security of the valuable information being managed.

In these scenarios, an air gap network may be implemented to keep the information secure while still allowing physical access to the devices. An air gap network is a computer system of devices that is restricted from communicating with other networks even though the devices may or may not be network-connected to each other within the air gap network. Devices within an air gap network are generally unable to establish communications to transfer information to devices outside the air gap network, and this isolation of the devices within the air gap network promotes security of the valuable information managed within the air gap network while still allowing the devices to productively communicate with each other.

Occasionally, air gap networks include use-case-specific processes that are monitored and audited for transferring select subsets of information into and sometimes even out of the air gap network. To best promote safety of the information contained in the air gap network, many air gap networks still limit outbound information to physical documents or a static electronic copy of electronic documents that must be reviewed by a security professional before leaving the premises.

The air gap network is accessible only to users with adequate security clearance and permissions to access the air gap network. Due to the physical isolation of many air gap networks, the user must access the network on-site.

If the computer system in an air gap network experiences an error, the underlying problem is addressed by a user with adequate security clearance and permissions who hopefully knows enough about the underlying problem to efficiently resolve the problem. In many cases, due to the diverse range of software and hardware operating as part of the computer system in the air gap network, there is no single expert who has the needed clearance to solve the problem. This can lead to lengthy and expensive phone calls to bring a cleared user up to speed on the diverse range of software and hardware in the system. In some scenarios, when the underlying problem is unknown, there is no known way to resolve the problem within the practical time constraints of these scenarios.

BRIEF SUMMARY

A computer system performs tasks in an access-restricted environment. Data is logged in diagnostic files about logical resources in use by the computer system as the computer system attempts to perform the tasks. Occasionally, a problem may prevent the computer system from correctly performing a task. A machine authenticates a user in the access-restricted environment and receives error metadata to initiate an automated process for generating a troubleshooting signature. The automated process involves selecting a metadata extraction policy based on a category of error and using the metadata extraction policy to extract metadata from a diagnostic file. The extracted metadata is analyzed to determine troubleshooting components including the problem, a source of the problem, and/or a version of software that encountered the problem. These troubleshooting components are combined in the troubleshooting signature, which is consumed in a diagnostic tool environment that is separate from the access-restricted environment.

In various embodiments, methods are described for performing the techniques described herein. In various other embodiments, computer-readable media store instructions that, when executed by one or more processors, cause performance of the methods described herein, and individual steps or combinations of steps of those methods. The methods are described with respect to a machine in an access-restricted environment and another machine in a diagnostic tool environment. The machine in the access-restricted environment may be specially configured with hardware and software to perform the methods or steps or combinations of steps that can be performed within the access-restricted environment, and the other machine in the diagnostic tool environment may be specially configured with hardware and software to perform the methods or steps or combinations of steps that can be performed outside the access-restricted environment with access to diagnostic tools.

In one embodiment, a computer-implemented method includes storing diagnostic files as a computer system attempts to perform different tasks in an access-restricted environment. The diagnostic files include diagnostic metadata, such as: identifiers of logical resources in use by the computer system as the computer system attempts to perform the different tasks, and data values associated with logical resources of the plurality of logical resources as a result of the computer system attempting to perform the different tasks. As the computer system performs tasks and logs activity that occurred during or resulting from attempts to perform the tasks, a particular problem may occur that prevents the computer system from correctly performing one or more of the different tasks. In one example, the occurrence of the particular problem is recognized by one or more human operators and logged as an error in an error database. In another example, the occurrence of the particular problem is recognized by an autonomous diagnostic system that logs the error in the error database without human intervention.

After the error has occurred, a machine in the access-restricted environment authenticates a user to the access-restricted environment. The access-restricted environment is restricted from communicating information over any computer network to a separate diagnostic tool environment that is also accessible to the user. In the access-restricted environment, the computer-implemented method further includes receiving error metadata that identifies a starting set of information in the access-restricted environment for troubleshooting a particular error resulting from the particular problem. The error metadata, without analysis of the starting set of information in the access-restricted environment, does not reveal which problem of at least two different candidate problems of a plurality of different candidate problems resulted in the particular error.

The computer-implemented method continues by initiating a signature generation mode using the starting set of information. In the signature generation mode, without requiring any additional troubleshooting from the user and based at least in part on the starting set of information, the computer-implemented method accesses, from the diagnostic files, one or more particular diagnostic files potentially relevant to the particular error. Also without requiring any additional troubleshooting from the user and based at least in part on the starting set of information, the computer-implemented method selects one or more particular categories of the particular error from a plurality of candidate categories of errors.

In one embodiment, the signature generation mode continues through a process of policy selection, metadata extraction, problem identification, source identification, and signature generation without requiring any additional troubleshooting or optionally any input at all from the user. Based at least in part on the selected one or more particular categories of the particular error, the computer-implemented method selects one or more diagnostic metadata extraction policies from different candidate diagnostic metadata extraction policies managed in the access-restricted environment. The computer-implemented method further includes applying the one or more diagnostic metadata extraction policies to extract, from the one or more particular diagnostic files, particular diagnostic metadata specific to the selected one or more particular categories of the particular error. The particular diagnostic metadata identifies one or more particular logical resources of a plurality of particular logical resources in the one or more particular diagnostic files.

Based at least in part on comparing the particular diagnostic metadata to known patterns of diagnostic metadata for at least one of the different candidate problems, the computer-implemented method identifies the particular problem from the different candidate problems. The different candidate problems also include one or more other candidate problems that, if present, would result in a different error other than the particular error.

The computer-implemented method also identifies a particular source of the particular problem from a plurality of different candidate sources of the particular problem based at least in part on the one or more particular logical resources identified by the particular diagnostic metadata.

With the problem and source identified, the computer-implemented method completes generation of a signature for the particular problem. The signature comprises human-readable text, including, by way of example, a problem identifier that identifies the particular problem from the different candidate problems, a source identifier that identifies the particular source from the plurality of different candidate sources, and/or a version of software for which the particular problem occurred. The signature is outputted or displayed on a machine in the access-restricted environment, or on a machine that consumes signature-derived information from the access-restricted environment. The signature is consumable by a diagnostic interface in the separate diagnostic tool environment.

The access-restricted environment may be an air-gapped network, such as one that is logically and/or physically isolated from all networks outside of the air-gapped network. The diagnostic interface may be provided by another machine in the separate diagnostic tool environment that is not in the air-gapped network, even though the user has access to both the machine in the air-gapped network and the other machine that is not in the air-gapped network. In one embodiment, the computer-implemented method further includes, on the other machine in the separate diagnostic tool environment, authenticating the user to the separate diagnostic tool environment such that the user remains authenticated to the access-restricted environment and to the separate diagnostic tool environment at a same time.

In one embodiment, receiving the error metadata includes receiving input to the machine from the user. The input identifies a first diagnostic file, and said accessing the one or more particular diagnostic files potentially relevant to the particular error includes identifying one or more diagnostic files other than the first diagnostic file based at least in part on analyzing information about the particular error from the first diagnostic file.

Alternatively or additionally to analyzing information about the particular error itself, additional information relevant to the particular error may be may be discovered based on a computer system topology. The computer system topology is accessed to determine a relationship between a first computer system resource identified from the starting set of information and a second computer system resource having a direct or indirect dependency relationship with the first computer system resource in the computer system topology.

The diagnostic metadata extraction policies are used for extracting diagnostic metadata from diagnostic files. In one embodiment, the selected one or more diagnostic metadata extraction policies include instructions for locating a first marker within a given diagnostic file. In this embodiment, the step of applying the one or more diagnostic metadata extraction policies to extract, from the one or more particular diagnostic files, the particular diagnostic metadata specific to the selected one or more particular categories of the particular error may include locating the first marker in the one or more particular diagnostic files. The one or more other diagnostic metadata extraction policies not selected for the one or more particular categories of the particular error may include other instructions for locating a second marker within a given diagnostic file. The second marker may be different than the first marker, and the second marker may be irrelevant to the one or more particular categories of the particular error. As the first marker is relevant, the first marker may be used to identify the particular diagnostic metadata for extraction based at least in part on a location, within the one or more particular diagnostic files, of the particular diagnostic metadata relative to a location of the first marker.

In one embodiment, a machine learning model guides the process of determining which diagnostic metadata is relevant to which categories of errors to identify which problems. The method further includes receiving and storing, within the access-restricted environment, a machine learning model trained outside the access-restricted environment on diagnostic metadata that is relevant to errors that occurred on other computer systems outside the access-restricted environment to identify problems on the other computer systems outside the access-restricted environment. The one or more metadata extraction policies are defined or selected based at least in part on the machine learning model determining which diagnostic metadata is relevant to which categories of errors to identify which problems.

In various embodiments, the particular logical resource(s) identified by the particular metadata and used to identify the particular source and/or the particular problem include one or more of the following logical resources:

a process, function, or event that was operating on the computer system to cause the particular problem as the computer system attempted to perform the one or more tasks, a hardware or software resource having a state that was different from an expected state of the hardware or software resource as the computer system attempted to perform the one or more tasks, an external logical resource that is external to the computer system but was in use by the computer system as the computer system attempted to perform the one or more tasks, a storage construct storing one or more particular data values of said data values as the computer system attempted to perform the one or more tasks, a storage construct attempting to store incompatible data values of said data values as the computer system attempted to perform the one or more tasks, one or more referenced logical resources in a section of instructions that were being executed as the computer system attempted to perform the one or more tasks, one or more sections of instructions that were simulated to not correctly perform the one or more tasks that the computer system attempted to perform, or one or more query execution resources that were being used to execute one or more queries as the computer system attempted to perform the one or more tasks, wherein the one or more queries were otherwise predicted to correctly perform the one or more tasks.

In the separate diagnostic tool environment, in one embodiment, the method includes receiving and processing the human-readable text. In response to the step of receiving the human-readable text, the method includes communicating with a cloud diagnostic system to identify a runbook for addressing the particular problem. The runbook includes instructions to be performed in the access-restricted environment for addressing the particular problem. The diagnostic interface in the separate diagnostic tool environment may then cause display of the runbook.

The access-restricted environment may or may not allow for image scanning to transfer data between the access-restricted environment and the diagnostic tool environment. In one embodiment, on the machine in the access-restricted environment, a graphical image is displayed. The graphical image is deterministically mapped to the signature but for which the problem identifier, the source identifier, and/or a version of the software for which the particular problem occurred are not in human-readable text. An image reader device that is separate from the machine, and which may or may not be separate from the other machine in the diagnostic tool environment, may then capture the graphical image. The graphical image may be translated into the human-readable text of the signature by the image reader device or by the other machine in the diagnostic tool environment. The signature is input into the diagnostic interface in the separate diagnostic tool environment. The signature is displayed after the graphical image is translated into human-readable text.

In various aspects, an electronic device, computer system, or other machine is provided that includes one or more data processors and a non-transitory computer-readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

In one embodiment, a machine in an access-restricted environment includes a diagnostic file repository, an authentication mechanism, a signature generation tool, and a display driver. The diagnostic file repository is in the access-restricted environment and is configured to store a plurality of diagnostic files as a computer system attempts to perform a plurality of different tasks in an access-restricted environment. The plurality of diagnostic files include diagnostic metadata that includes identifiers of a plurality of logical resources in use by the computer system as the computer system attempts to perform the plurality of different tasks, and data values associated with logical resources of the plurality of logical resources as the computer system attempts to perform the plurality of different tasks. A particular problem prevents the computer system from correctly performing one or more tasks of the plurality of different tasks.

The authentication mechanism is also in the access-restricted environment and is configured to authenticate a user to the access-restricted environment. The access-restricted environment is restricted from communicating information over any computer network to a separate diagnostic tool environment that is also accessible to the user.

The signature generation tool is in the access-restricted environment, and, when activated, is configured to receive error metadata that identifies a starting set of information in the access-restricted environment for troubleshooting a particular error resulting from the particular problem. The error metadata, without analysis of the starting set of information in the access-restricted environment, does not reveal which problem of at least two different candidate problems of a plurality of different candidate problems resulted in the particular error. The signature generation tool initiates a signature generation mode for the starting set of information, and, in the signature generation mode without requiring any additional troubleshooting from the user and based at least in part on the starting set of information, accesses, from the plurality of diagnostic files, one or more particular diagnostic files potentially relevant to the particular error, and selects one or more particular categories of the particular error from a plurality of candidate categories of errors. The signature generation tool selects one or more diagnostic metadata extraction policies from a plurality of different diagnostic metadata extraction policies managed in the access-restricted environment based at least in part on the selected one or more particular categories of the particular error. Then, the signature generation tool applies the one or more diagnostic metadata extraction policies to extract, from the one or more particular diagnostic files, particular diagnostic metadata specific to the selected one or more particular categories of the particular error. The particular diagnostic metadata identifies one or more particular logical resources of a plurality of particular logical resources in the one or more particular diagnostic files.

Also without requiring any additional troubleshooting, the signature generation tool identifies the particular problem and a particular source of the problem, as well as a signature including the particular problem, the particular source, and/or a version of software for which the particular problem occurred. The particular problem is identified based at least in part on comparing the particular diagnostic metadata to known patterns of diagnostic metadata for at least one of said at least two different candidate problems. The plurality of different candidate problems include said at least two different candidate problems and one or more other candidate problems that, if present, would result in a different error other than the particular error. The particular source is identified based at least in part on the one or more particular logical resources identified by the particular diagnostic metadata. The signature generated is human-readable text.

The display driver is configured to cause display, on a display, of the signature. The signature is consumable by a diagnostic interface in the separate diagnostic tool environment.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
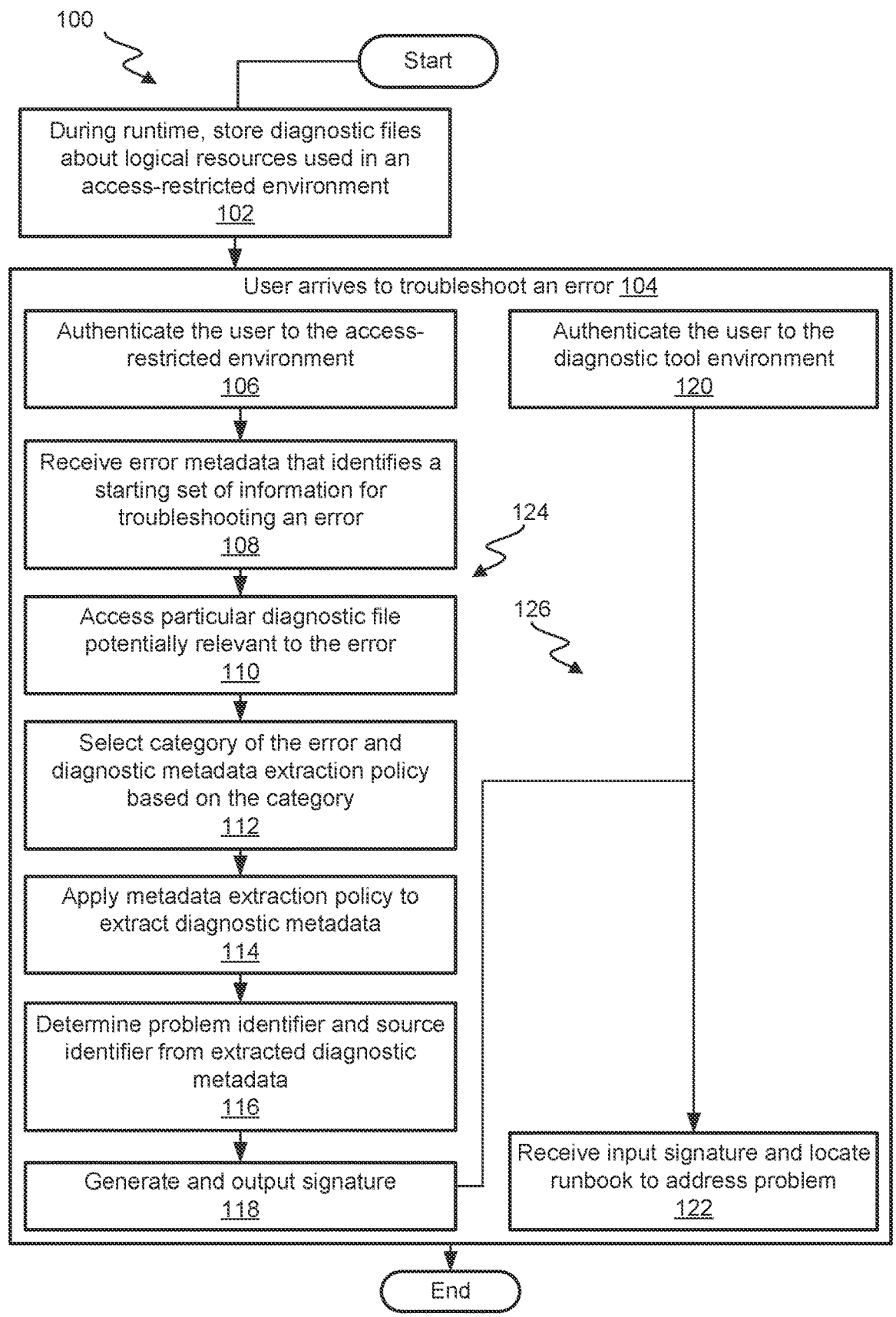
FIG. 1 illustrates a flow chart for generating a signature in an access-restricted environment to troubleshoot a problem with a computer system in an access-restricted environment.

Various embodiments described herein include an automated process for extracting metadata from diagnostic file(s) in an access-restricted environment and analyzing the extracted metadata to determine troubleshooting components including a problem, a source of the problem, and/or a version of software that encountered the problem. The troubleshooting components, as well as optional other components, may be included in a troubleshooting signature that is consumable in a diagnostic tool environment that is separate from the access-restricted environment. In the diagnostic tool environment, the signature may be consumed via a diagnostic tool interface in order to search a solution repository in a diagnostic cloud, with access to problems and solutions encountered across tenants in the public cloud, and across other vendor clouds. Within the diagnostic tool environment, a solution for the problem may be found, and the solution may be implemented in the access-restricted environment without violating access restrictions and without having the diagnostic tool environment connected via any computer network to the access-restricted environment.

The method for troubleshooting problems in an access-restricted environment is described herein in the following sections:

LOGGING DIAGNOSTIC INFORMATION
AUTHENTICATING THE USER INTO THE ACCESS-RESTRICTED ENVIRONMENT.
INITIATING GENERATION OF THE DIAGNOSTIC SIGNATURE
CATEGORIZING THE ERROR
EXTRACTING DIAGNOSTIC METADATA
IDENTIFYING TROUBLESHOOTING COMPONENTS
OUTPUTTING THE DIAGNOSTIC SIGNATURE
USING THE TROUBLESHOOTING COMPONENTS TO IDENTIFY A CANDIDATE Solution
IMPLEMENTING AND TESTING THE CANDIDATE SOLUTION IN THE ACCESS-RESTRICTED ENVIRONMENT
CLOSING OUT OR ESCALATING THE ERROR
COMPUTER SYSTEM ARCHITECTURE As the various sections describe separate but interoperable components of the system, techniques from the various sections may be combined together in any manner to accomplish the overall goal of troubleshooting problems occurring in an access-restricted environment that does not have network access to a diagnostic cloud.

As used herein, "access-restricted environment" may refer to any environment where an error has occurred and which is prevented from communicating directly with a diagnostic tool environment where information about a problem that caused the error can be consumed. The access-restricted environment may be physically isolated from the diagnostic tool environment (not accessible from outside of the access-restricted environment's access-restricted premises) and/or virtually isolated from the diagnostic tool environment (not accessible due to network-imposed restrictions). The inaccessibility may be one-directional, allowing the diagnostic tool environment to send information to the access-restricted environment without the access-restricted environment being able to communicate back to the diagnostic tool environment, or bidirectional, where neither environment can communicate any information to the other. This inaccessibility between the access-restricted environment and the diagnostic tool environment poses a significant difficulty in diagnosing problems in the access-restricted environment.

Logging Diagnostic Information

Figure 2:
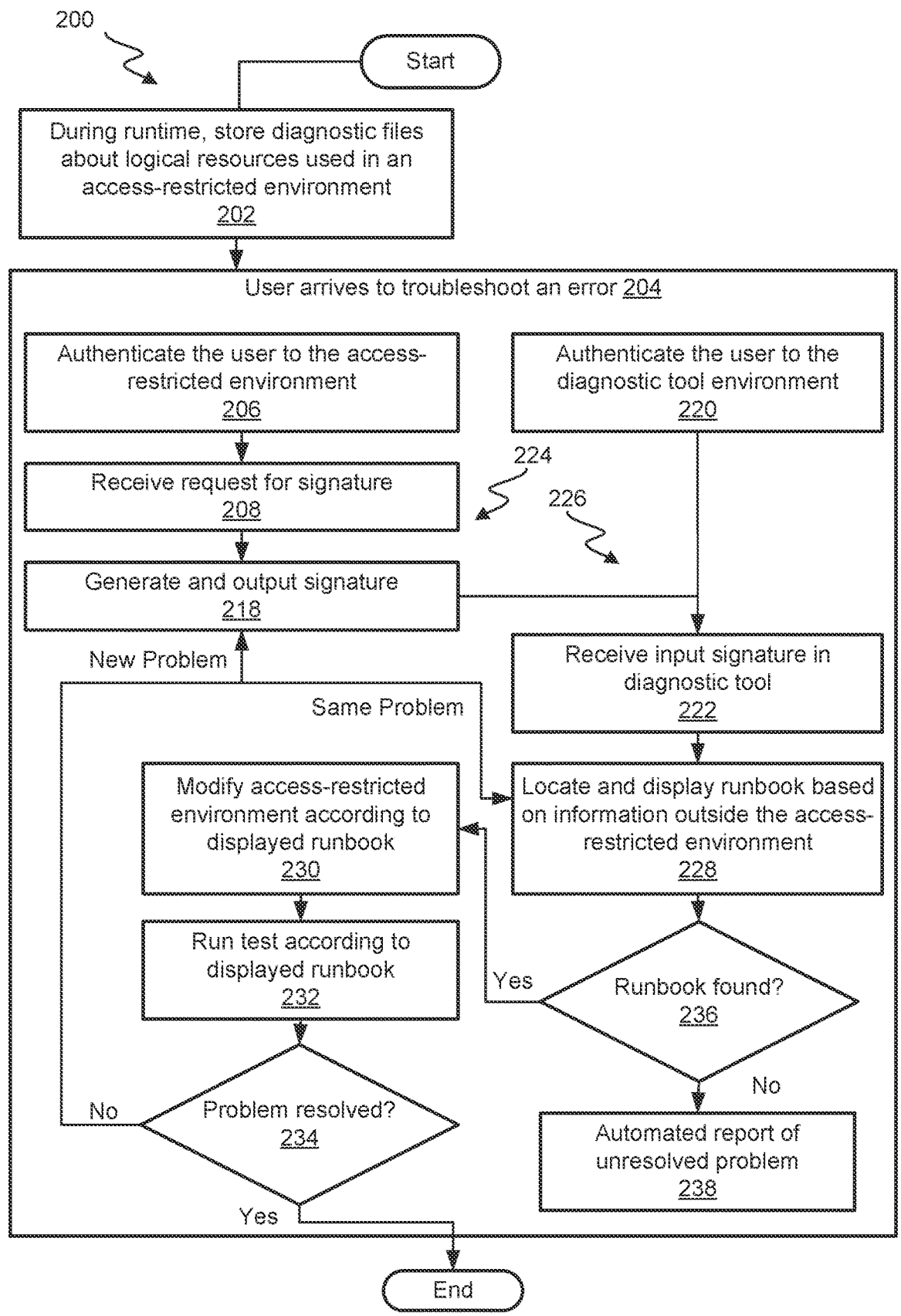
FIG. 2 illustrates a flow chart for consuming a signature in a diagnostic tool environment to troubleshoot a problem with a computer system in an access-restricted environment.

FIG. 1 illustrates a flow chart of signature generation process 100. FIG. 2 illustrates a flow chart of a signature consumption process 200. As shown, the processes in FIGS. 1 and 2 begin with steps 102 and 202, respectively, where, during runtime, diagnostic files are stored about logical resources that are used in an access-restricted environment.

FIGS. 3A-3F show diagrams for generating a signature in the access-restricted environment for use in the diagnostic tool environment. As shown, diagnostic files 318 may be stored in access-restricted cloud 316. Diagnostic files 318 include information gathered during runtime operation of a computer system in the access-restricted environment. For example, the diagnostic information may include trace files, logs, stack traces, etc., that were generated as a result of the computer system attempting to perform a task, or otherwise generated as the computer system operates.

As used herein, "computer system" means any special-purpose software or hardware or combination of special-purpose software or hardware, local, remote, and/or distributed, that operates to perform a task. When software and/or hardware has dependencies on other software and/or hardware to attempt or correctly perform a task, the elements of the combined system are said to be working together to perform the task.

FIGS. 3A-3F also show diagnostic files 328 in diagnostic cloud 326. In the example, these diagnostic files 328 include information gathered during runtime operation of a computer system outside the access restricted environment. Diagnostic files 328 may be pushed to access-restricted cloud 316 periodically via a limited unidirectional asynchronous update. Additionally or alternatively, diagnostic cloud 326 may construct new or updated extraction policies and models 330 based on new or updated diagnostic files 328 observed in historical data, and these new or updated extraction policies or models 330 may be sent periodically to access-restricted cloud 316 via a limited unidirectional asynchronous update. These limited unidirectional asynchronous updates may be monitored to ensure confidential data in access-restricted cloud, or access thereto, is never sent back to diagnostic cloud 326.

In various embodiments described herein, such as in relation to the Limited Unidirectional Asynchronous Update between diagnostic cloud 326 and access-restricted cloud 316 in FIGS. 3A-3F, metadata, models, policies, files, software, and other information may be communicated to the access-restricted cloud using an air gap solution. For example, a diagnostic cloud provider may ship a hard drive or other storage device to an admin of the access-restricted cloud, and the admin of the access-restricted cloud may inspect the storage device and/or test any software running on the storage device before placing the information from the storage device in service in the access-restricted network. In another example, a diagnostic cloud provider may provide an Internet-accessible download of any information updates to be sent into the access-restricted cloud, for example, through an IP tunnel or virtual private network. An admin of the access-restricted environment may, using a machine disconnected from the access-restricted environment, download the software or other information updates, inspect the information, and place the information into service in the access-restricted environment by moving the information onto a device in the access-restricted environment.

Occasionally, errors occur on device(s) operating in the access-restricted network. An error is an occurrence or incident of a failure of software and/or hardware to correctly complete a task which should have been correctly completed. The cause of an error is an underlying problem, and a single problem may cause multiple errors. Errors can occur on any software or hardware operating in or with the access-restricted environment, and information about these errors may be logged in diagnostic files in a cloud-based diagnostic file repository in the 14cess-restricted environment or of a particular computer system in the access-restricted environment. As non-limiting examples, errors can occur on application components, middleware components, database components, or using other more specific logical resources such as particular libraries, classes, objects, functions, containers, registers, stack frames, interfaces, events, memory chunks, assembly instructions, SQL queries or clauses, etc. that may be more closely related to the underlying problem in those high-level software components.

More generally, a logical resource is any identifiable resource used or referenced by software during operation or in diagnostic files that result from operation. These logical resources may be mentioned or referenced in the diagnostic files generated as a result of logged operation of the software or otherwise as a result of the error, and information about the way these logical resources were being used at the time of the error, the values assigned to or produced by different logical resources, the status of the logical resources, and/or the interactions between logical resources is helpful for understanding what caused the error. That said, a single diagnostic file could reference tens, hundreds, or even thousands of different logical resources that were in use by the software at the time of the error, and many or all of these referenced logical resources may be irrelevant to the underlying problem that caused the error. That said, one or a few of these referenced logical resources may provide enough information to diagnose and fix the problem and hopefully to avoid any future errors caused by the problem.

The error may or may not trigger an error message that identifies the error. Even if an error message is triggered, the error message may not be uniquely mapped to a known solution, without more information. In one example, the error is detected when a software user in the access-restricted environment is trying to accomplish a task using software running on a computer system in the access-restricted environment. The software user may notice that the task is not completed correctly. In another example, an error or exception is triggered, but the software user does not know how to fix the error. Or, the error may be due to third party software installed in the access-restricted environment, for which the third party needs to be involved in fixing the error. Upon noticing the error in an environment that is not connected to the Internet, the software user or a representative of the software user may call a service desk of a third party software vendor, such as Oracle®, Google®, or IBM®. Alternatively, the software user may use another device outside of the access-restricted environment to report the error, as long as such reporting complies with the policies of the access-restricted environment.

Once the error has been reported with whatever limited details can be communicated using the limited means (e.g., voice, or from memory after leaving the access-restricted environment) of the software user from the access-restricted environment, a system operations user may determine that additional information and additional troubleshooting is needed to determine what problem is occurring with the software. There is no way to gather this additional information from outside the access the access-restricted environment, due to the access restrictions. Accordingly, the system operations user uses an agreed-upon mode for accessing the access-restricted environment, assuming the system operations user has proper security credentials to do so. If not, another system operations user that does have the proper security credentials, perhaps with less knowledge of the software, may use the agreed-upon mode for accessing the access-restricted environment. In another embodiment, an admin or other user in the access-restricted environment may access a machine in the access-restricted environment on behalf of the system operations user, but with the communication limitations imposed on the access-restricted environment. In order to mitigate those limitations, the admin or other user in the access-restricted environment may bring another machine from outside the access-restricted environment to assist with the troubleshooting. Regardless of who troubleshoots the error, the troubleshooting user must work within the boundaries of the access-restricted environment.

Before accessing a machine in the access-restricted environment to gather more information, the troubleshooting user may have some information about the error that is insufficient to determine a solution for the problem causing the error, and possibly even insufficient to identify the problem causing the error. For example, the troubleshooting user may have an identifier of a database incident, knowing that the database incident is associated with one or more trace files stored in the access-restricted network. The troubleshooting user cannot access those files from outside the access-restricted network, though, and will not be able to solve the problem unless there is a single known solution for the database incident. The trace file cannot be committed to human memory, either, because the trace files often contain kilobytes or even megabytes of data. In scenarios where there are multiple candidate solutions for the error, each possibly caused by different underlying problems, the troubleshooting user needs more information from the access-restricted environment to identify a valid solution.

In one example, the software user experiences a tool problem that causes an error. The tool attempts to perform a backup operation in a private cloud in the access-restricted environment according to settings or selections made by the software user, but the tool is not able to perform the backup operation, potentially with or without an error message or other error code being provided to the software user. The software user reports an error by notifying an operations user that the backup is not correctly occurring. There could be many underlying problems causing the backup to not correctly occur, and with just this error information, the operations user cannot efficiently or practically solve the problem or instruct the software user or an admin of the access-restricted network on how to solve the problem. Further, the operations user cannot find more information in the access-restricted environment without being cleared for access into the environment. The operations user may select a generic backup failure error ID that covers multiple different problems that could lead to a backup not occurring, and the operations user may use the backup failure error ID as error metadata when beginning the troubleshooting process in the access-restricted environment. In another embodiment, the operations user may identify a particular diagnostic file, such as a trace file, that should be present in the access-restricted environment and may be helpful to understand what is causing the error, and the identity of the particular diagnostic file may alternatively or additionally be used as error metadata when beginning the troubleshooting process in the access-restricted environment.

In another example, the software user experiences a crash in software that was running. As a result of the crash, the computer system logs trace files, stack dumps, system logs, and other diagnostic files to record a state of the computer system and, to the extent possible, the software, at the time of the crash. In this example, an identity of a particular diagnostic file, an identity of a zipped collection of diagnostic files or a folder or directory containing a collection of diagnostic files, a collection of identities of different diagnostic files, a timestamp of the crash or when the diagnostic files were written, or even a name of the software that crashed can be used as error metadata to begin the troubleshooting process in the access-restricted environment. The error metadata may be chosen by the software user or an admin in the access-restricted environment, possible in a phone call with a systems operation user knowledgeable about the software that crashed but who does not yet have access to the access-restricted environment.

Regardless of whether the operations user has an error ID, a diagnostic file ID, or a location or time of where such diagnostic file would be, the operations user is said to be in possession of "error metadata" that identifies a starting set of information in the access-restricted environment for troubleshooting the particular error resulting from the particular problem. The error metadata by itself does not solve any problem, though, as the operations user cannot supplement the known error metadata with the unknown contents of diagnostic files in the access-restricted environment. Without access to the access-restricted environment, the operations user cannot gather the additional information needed solve the problem. Even with access to the access-restricted environment, without the signature generation tool described here, the operations user would need to apply his expert knowledge of the computer system for an extensive period of time to test, troubleshoot, and analyze potentially thousands of pages of diagnostic files. For these reasons, the error metadata, without further analysis in the access-restricted environment, does not reveal which problem of different candidate problems resulted in the particular error.

Authenticating the User into the Access-Restricted Environment

Referring to the processes in FIGS. 1 and 2, a user or troubleshooting user, such as a system operations user or admin, arrives to troubleshoot an error in steps 104 and 204, respectively. The site includes a machine in an access-restricted environment, denoted by sides 124 and 224, respectively, and another machine in a diagnostic tool environment, denoted by sides 126 and 226, respectively. The access-restricted environment may also be referred to as the "high side," as machines in the access-restricted environment are highly restricted in terms of how they can communicate with other machines. In one embodiment, the "high side" uses an air gap network, along with air gap network protocols, computer-implemented information flow policies, human-implemented information protection policies, and/or network traffic filters, to ensure that devices on the "high side" cannot communicate information to devices outside of the "high side." The access-restricted environment may be set up to protect national security interests, top secret projects, trade secrets, or other highly valuable confidential information. In various embodiments, the access restrictions of the access-restricted area prevent taking screenshots from any machines in the access-restricted area, prevent screen shares during Zoom®, Teams®, or other conference calls, prevent chat and copy-and-paste of information between machines, prevent Slack access, prevent Email access, prevent phone calls, prevent sharing of logs, telemetry, errors, or customer identifiable information electronically, prevent submitting bug fixes or other troubleshooting tickets electronically, and/or prevent any other mechanism for electronically copying text or other information, particularly sensitive or confidential information, from the access-restricted area to any machine outside the access-restricted area.

The diagnostic tool environment may be referred to as the "low side," as machines in the diagnostic tool environment may have access to the Internet and other less restricted forms of communication. In steps 106 and 206, the machine in the access-restricted environment, optionally in communication with an access-restricted cloud, authenticates the user to the access-restricted environment.

FIGS. 3A-3F show diagrams for generating a signature in the access-restricted environment for use in the diagnostic tool environment. As shown in scenes 300A-300F, user 302 enters privileged area 306 through door 304. Door 304 may be secured with a key card or fob keyless entry so user 302 can scan in securely. In one embodiment, privileged area 306 is equipped with a security mechanism that ensures user 302 has security access clearance sufficient to enter privileged area 306 before entering through door 304. Such access clearance may require training and certification for user 302 to handle highly sensitive data. In one embodiment, privileged area 306 is a Sensitive Compartmented Information Facility (SCIF) or an Oracle® Cloud Network Operations Center (CNOC). In another embodiment, privileged area 306 is a conference room, office space, or warehouse. Once inside privileged area 306, user 302 can log into machine 312 using keyboard 310 and other machine 322 using, in the example, a built-in keyboard. In the examples shown, machine 312 is connected to a display 314, and other machine 322 includes a built-in display. As user 302 enters credentials into machine 312, machine 312 may check a local user registry on machine 312 and/or access-restricted cloud 316 to see if the entered credentials match a user profile that is permitted to access machine 312 in the access-restricted environment. Machine 312 may be connected to access-restricted cloud 316 via an internal network within the access-restricted environment and disconnected from Internet 334. In the case where user profile information is stored in access-restricted cloud, such user profile information may be updated or managed from privileged area 306 or other privileged areas that are in different physical locations but also have access via the internal network to access-restricted cloud 316.

Once logged into machine 312 in the access-restricted environment, user 302 may access a signature generation tool from an interface on machine 312. Although user 302 interacts with the signature generation tool from the interface on machine 312, the signature generation tool may run locally on machine 312 or remotely in access-restricted cloud 316, which may be connected to machine 312 via a network that is isolated from other networks.

Similarly, user 302 may enter different credentials into machine 322 to log into the diagnostic tool environment. For example, as shown, machine 322 may be on a same desk 308 as machine 312, even though machine 322 and machine 312 are network environments that are isolated from each other. Machine 322 may check a local user registry on machine 322 and/or diagnostic cloud 326 to see if the entered credentials match a user profile that is permitted to access machine 326 in the diagnostic tool environment. Machine 322 may be connected to diagnostic cloud 326 using an internet service provider, mobile service provider, or any other Internet access technique, or via a network internal to the diagnostic tool environment. In the case where user profile information is stored in diagnostic cloud 326, such user profile information may be updated or managed from anywhere that has access to diagnostic cloud 326 via, for example, network connectivity, even in locations that are outside of the access restricted environment and privileged areas covered by the access-restricted environment. In one embodiment, privileged area 306 is a SCIF that is configured with electromagnetic shielding to block all communications outside the SCIF. In that scenario, machine 322 may use runbooks and diagnostic tools local to machine 322 in order to find a solution to the problem. Machine 322 may update the runbooks and diagnostic tools before entering or after leaving privileged area 306 in the case where privileged area 306 has electromagnetic shielding.

User 302 may interact with machine 312 and/or machine 322 using various interfaces. For example, a terminal may provide a command-line interface for the user to type in commands and run various tools. As another example, the machines may offer a graphical user interface that provides a layer of abstraction on top of the command-line interface for finding and running tools more efficiently. Regardless of the type of interface, user 302 can interact with machine 312 to run a signature generation tool, and with machine 322 to run a diagnostic tool for consuming the generated signature.

Initiating Generation of the Diagnostic Signature

Referring again to the processes in FIGS. 1 and 2, a signature generation tool accessed via the machine in the access-restricted environment receives error metadata that identifies a starting set of information for diagnosing an error that resulted from a problem in steps 108 and 208, respectively. The signature generation tool may be hosted locally on the machine or in an access-restricted cloud accessible to the machine within an access-restricted environment. The error metadata along with any other user input selecting to generate a signature serves as the request for a signature in the access-restricted environment. For example, the error metadata may identify a starting set of information in the access-restricted environment for troubleshooting an error, even though the error metadata itself, without analysis of the starting set of information in the access-restricted environment, does not reveal which problem resulted in the error. In a specific example, the error metadata may identify an error such as a database incident or other error message that led to troubleshooting software in the access-restricted environment. In another example, the error metadata may include the incident identifier and/or a trace file or other diagnostic file associated with the incident identifier. In another example, the error metadata may include a timestamp of the error and/or an identifier of a software offering for which the error occurred. The request leads to steps 118 and 218, respectively, where a signature is generated and output for consumption.

As shown in FIGS. 3A-3F, user 302 may engage with machine 312 in access-restricted environment to provide input. In an example not shown, user 302 may engage with machine 312 to provide information about one or more errors that were logged against a computer system in the access-restricted environment. This information about errors is called "error metadata." The error metadata may be sufficient to identify an error that occurred, but the error metadata might at the same time be insufficient to identify an underlying problem that caused the error. As used herein, an "error" is a logged occurrence of when the computer system did not correctly perform a task that the computer system was instructed or requested to perform.

Once the signature generation tool is initialized with error metadata being passed in to start the process of categorizing the error and extracting diagnostic metadata to generate the signature, there should be no additional troubleshooting required from the user to complete generation of the signature. In other words, the signature generation tool is capable of consuming the error metadata to, without user input, categorize the error, extract metadata from diagnostic files, identify the problem, identify the source, and/or identify the version, and output the signature. In various embodiments, the signature generation tool may provide options for the user to become more involved in the diagnostic process, but the tool is capable of running from start to completion without any such intervention from the user. The metadata extraction policies allow the tool to automatically extract the metadata relevant to the problem and use the extracted metadata to identify the problem and the source of the problem, without guidance or expertise required from the user. In one embodiment, after the user inputs the error metadata into the tool, the user does not provide any additional user input before the signature is displayed on the screen.

Categorizing the Error and Extracting Diagnostic Metadata

Referring to the detailed process in FIG. 1, the signature generation tool running in the access-restricted environment accesses a particular diagnostic file potentially relevant to the error in step 110. The signature generation tool then selects a category of the error and a diagnostic metadata extraction policy based on the category in step 112.

In the detailed process of FIG. 1, once the metadata extraction policy has been selected in step 112, the metadata extraction policy is applied in the access-restricted environment to extract diagnostic metadata in step 114.

As shown in FIGS. 3A-3F, extraction policies and models 320 may be stored in the access-restricted environment by being stored and accessed from access-restricted cloud 316, or (not shown) by being stored and accessed directly from local machine 312. In the embodiment shown, extraction policies and models 320 may be asynchronously updated from diagnostic cloud 326 via a limited unidirectional asynchronous update. The limited unidirectional asynchronous update may be monitored to ensure that the update occurs only during designated times, only changes designated storage regions in access-restricted cloud 316, and is unable to trigger any additional functionality or leak any confidential information from within access-restricted cloud 316 or otherwise in the access-restricted environment to diagnostic cloud 326 or otherwise to anywhere outside of the access-restricted environment.

A category of error may be any information that helps the signature generation tool narrow down the available or candidate set of diagnostic metadata extraction policies to a smaller relevant set of diagnostic metadata extraction policies that are more relevant to the error metadata for which the signature is being generated. In one embodiment, a category (e.g., type) of error is determined based on the software involved in the error. For example, if, from the diagnostic file, the build label, version, or other information indicates that the software is database software, a set of database-software-related metadata extraction policies are used. As another example, if information from the diagnostic file indicates that the software is operating system software, a set of operating-system-related metadata extraction policies are used. As yet another example, if information from the diagnostic file indicates that the software is software for a particular application, such as a Human Capital Management application, a set of metadata extraction policies for that application may be used to parse the diagnostic file and extract metadata.

In another embodiment, the category of error is determined based on the operation or logical resource that failed, if such information is known from the error metadata. For example, if a memory leak is detected, metadata extraction policies for finding metadata relevant to memory leaks. As another example, if a crash is detected, metadata extraction policies for finding metadata relevant to crashes is used. Other metadata extraction policies may also be targeted to handle a category of errors that do not provide clear error messages to the software user.

In yet another embodiment, the category of error is determined based on a numbering scheme of an error identified in the error metadata or an error marked as an error or exception in a diagnostic file identified in the error metadata. For example, different metadata extraction policies may be used for 600-series errors than for 7000-series errors. Even for a single error code, such as ORA-600, there may be multiple metadata extraction policies available to use or try for extracting metadata from the diagnostic files. If the markers or relationships sought by the candidate metadata extraction policy are not available in the diagnostic file, another candidate metadata extraction policy in the same category may be tried.

In one embodiment, the metadata extraction policies are heuristics or rules that explain what key values, key variables, key messages, or other markers to look for in the diagnostic metadata, whether any calculations need to be made based on those key values, whether any references need to be followed from within the diagnostic files from a marker or initial logical resource to find another logical resource relevant to the error, whether a pathway to the target logical resource requires looking at specific lines of the diagnostic file or specific locations relative to a marker, what delimiters and noise data needs to be removed to find the logical resource involved in the error, and/or how to extract relevant information once a logical resource or marker is found.

In a first example, after a software crash, metadata extraction policies for analyzing diagnostic files such as a 20,550-page diagnostic file includes a rule to search for a marker, "exception encountered: core dump." In the example, the marker may appear 7 times in the document, each time followed by "[psdProcBnd( )+48]," and each time preceded by "ORA-07445:". In the example, the lines that include "exception encountered: core dump" all appear as follows:

. . .
ORA-07445: exception encountered: core dump [psdProcBnd( )+48][SIGSEGV] [ADDR:0x0][PC:0x11E2FEF0][Address not mapped to object][ ]
. . .

The metadata extraction policies may include heuristics for looking at the text surrounding this marker to determine, after removing the encasing brackets and delimiting text, that the error is identified as ORA-07445, and a source of the error is the psdProcBnd function. The metadata extraction policies may also include heuristics for extracting the build label or software version by looking for "Build label" or "build_label," each of which occurs once in the document followed by delimiting text and "RDBMS_PT.DBCLOUD19_LINUS.X64_231024," which is the version. The lines that include build label are as follows:

. . .
Build label: RDBMS_PT.DBCLOUD19_LINUX.X64_231024
: build_label=RDBMS_PT.DBCLOUD19_LINUX.X64_231024
. . .

This information may be combined together into the following output signature:

```
{
"Error" : ORA7445
"Source" : psdProcBnd
"Label" : RDBMS_PT.DBCLOUD19_LINUX.X64_231024
}
```

In a second example, after a memory leak, metadata extraction policies for analyzing diagnostic files such as a 43-page diagnostic file includes a rule to search for "MEMORY USAGE," which occurs once in a line that says, "SUMMARIZED MEMORY USAGE FOR THIS PROCESS". The metadata extraction policies may then crawl the listings appearing after this header by determining the section boundaries and the listing boundaries within the following text:

```
. . .
SUMMARIZED MEMORY USAGE FOR THIS PROCESS
   4194328 bytes,  1 chunk : "buf_kgcbz2state     "
       pga heap      ds=0x7f4481f532a0 dsprt=(nil)
   1048600 bytes,  1 chunk : "trans_kgcbz2state   "
       pga heap      ds=0x7f4481f532a0 dsprt=(nil)
     85104 bytes,  1 chunk : "state_kgcstream     "
       pga heap      ds=0x7f4481f532a0 dsprt=(nil)
     65384 bytes,  1 chunk : "free memory         "
       top uga heap  ds=0x7f4481f55ec0 dsprt=(nil)
       184 bytes,  1 chunk : "6290.kgght          "
       pga heap      ds=0x7f4481f532a0 dsprt=(nil)
       184 bytes,  1 chunk : "615.kggec           "
       pga heap      ds=0x7f4481f532a0 dsprt=(nil)
        96 bytes,  1 chunk : "kghdsx              "
       top uga heap  ds=0x7f4481f55ec0 dsprt=(nil)
■■■■■■■■■■■■■■■■■■■■■■■■■■■■■■■■■■■■
■■■■■■■■■■■■■■■■■■■■■■■■■■■■■■■■■■■■
■■■■■■■■■■
. . .
```

By looking for the term "bytes" and/or other size-indicating terms, the metadata extraction policies may extract how much space each chunk uses in memory. That analysis indicates that one chunk uses 4194328 bytes, which is 78% of the 5,393,880 total bytes consumed by all chunks and larger than expected for this chunk based on the rules or other known patterns. These calculations may exceed a relative and/or absolute memory usage threshold specified in the metadata extraction policies.

In another embodiment for the same example, the metadata extraction policies start by looking for the marker "ERROR: PGA memory leak detected". This term appears once in the following section:

```
. . .
******** ERROR: PGA memory leak detected 5328400 > 374104
********
********  : Leak detection threshold of 51200 bytes exceeded ********
SUMMARIZED MEMORY USAGE FOR THIS PROCESS
. . .
```

In this embodiment, the metadata extraction policies may crawl the text after the ERROR: PGA memory leak detected" to determine a leak was triggered when the total of either 374104 bytes or 51200 bytes were exceeded, each of which were exceeded by the first listing and the second listing in the summarized memory usage. Based on that, the metadata extraction policies may include a rule for selecting either the largest chunk that exceeded expected memory usage or all chunks that exceeded expected memory usage.

In yet another embodiment of the same example, the metadata extraction policies may start by looking for the markers "Error:" or "Error Descriptor:", which show up in the following lines:

```
. . .
********ERROR: PGA memory leak detected
5328400>374104********
. . .
Error Descriptor: ORA-600 [5328400][memory leak][ ][ ][ ][ ][ ][ ][ ]
. . .
Error: ORA-600 [5328400][memory leak][ ][ ][ ][ ][ ][ ][ ]
. . .
Error Descriptor:
. . .
```

After removing the marker and delimiters, the metadata extraction policies may determine that the error ORA-600 [723], which describes a "memory leak," is the type of error involved in the diagnostic file, and the metadata extraction policies may also find the section "SUMMARIZED MEMORY USAGE FOR THIS PROCESS," which is below the error: PGA memory leak detected line. The memory usage section provides the additional information as described.

The build label of the second example was formatted similarly to the first example and would involve a similar extraction process. In this second example, the output signature showing the largest chunk may be as follows:

{
 "Error": ORA-600
 "Source": buf_kgcbz2state
 "Label":
   RDBMS_PT.DBCLOUD19_LINUX.X64_231024
}

In a third example, after a classic assert error, metadata extraction policies for analyzing diagnostic files such as an 11,149-page diagnostic file, may search for the marker "Error:" to find the following lines that occur:
  call error: 0, sess error: 0, txn error 0
  Error: ORA-600 [6][ ][ ][ ][ ][ ][ ][ ][ ]
The rules in the metadata extraction policies may be configured to look for text or a non-zero number after the error, or an error line that is not indented. As a result, the rules would identify "ORA-600 [25029]" as the error.

For this type of error, the metadata extraction policies may further search the binary stack dump. For example, the metadata extraction policies may look for a frame where "ERROR SIGNALED: yes" is present, or for some other information that is dependent on the contents of the stack dump. For this example, the binary stack dump is in a section labeled: "---------------------Binary Stack Dump---------------------", and the section is followed by delimited frames including the following frames:
  ==============FRAME (krtts2bz_pdb( ) 565-> ksesic3( )==========
  defined by frame pointers 0x7fffbb63bdc0 and 0x7fffbb63bd70
  CALL TYPE: call ERROR SIGNALED: yes COMPONENT: (null)
  RDI 00007F53CA83F9E0 RSI 0000000000000000 RDX 00000000000003EF
  RCX 0000000000000000 R8 00000000000003EF R9 0000000000000000
  RAX 00007F53CA7C8538 RBX 000000850B554700 RBP 00007FFFBB63BDC0
  R10 00007FFFBB63BD50 R11 0000000000000000 R12 0000000000000000
  R13 0000000020000000 R14 00007F53CA892280 R15 000000850B554768
  RSP 00007FFFBB63BD80 RIP 00000000141CEA25
  Dump of memory from 0x7fffbb63bd70 to 0x7fffbb63bdc0
  7FFFBB63BD70 BB63BDC0 00007FFF 141CEA25 00000000 [ . . . c . . . % . . . ]
  7FFFBB63BD80 00000006 00000000 141CE917 00000000 [ . . . ]

```
7FFFBB63BD90  000003EF    00000000    00000006
  00000000 [ ... ]
7FFFBB63BDA0  00000000    00007F53    0B554700
  00000085 [ ... S ... GU ... ]
7FFFBB63BDB0  00002B55    00007FFF    143  AF095
  00000000 [U+ ... ]
==========FRAME  (kkdlgtbz(   )+168->krtts2bz_
  pdb( )==========
defined  by  frame  pointers  0x7fffbb63bf40  and
  0x7fffbb63bdc0
CALL TYPE: call ERROR SIGNALED: no COMPO-
  NENT: (null)
RDI 00007F53CA83F9E0 RSI 0000000000000000 RDX
  00000000000003EF
RCX 0000000000000000 R8 00000000000003EF R9
  0000000000000000
RAX 00007F53CA7C8538 RBX 000000850B554700
  RBP 00007FFFBB63BF40
R10 00007FFFBB63BD50 R11 0000000000000000 R12
  0000000000000000
R13 0000000020000000 R14 00007F53CA892280 R15
  000000850B554768
RSP 00007FFFBB63BDD0 RIP 000000000357AC68
Dump  of  memory  from  0x7fffbb63bdc0  to
  0x7fffbb63bfc0
7FFFBB63BDC0  BB63BF40    00007FFF    0357AC68
  00000000 [@.c ... h. W ... ]
7FFFBB63BDD0  00000000    00000000    00000000
  00000000 [ ... ]
Repeat 11 times
7FFFBB63BE90  BB63BF10    00007FFF    13F63BFB
  00000000 [ ... c ... ; ... ]
7FFFBB63BEA0  00000000    00000000    00000000
  00000000 [ ... ]
7FFFBB63BEB0  9E696530    00000075    9E696A88
  00000075 [0ei.u ... ji.u ... ]
7FFFBB63BEC0  00000001    00000000    00000001
  00000000 [ ... ]
7FFFBB63BED0  BB63BF30    00007FFF    140865A1
  00000000 [0.c ... e ... ]
7FFFBB63BEE0  00000000    00000000    A59275F0
  00000084 [ ... u ... ]
7FFFBB63BEF0  000057C9    00000000    A5927558
  00000084 [.W .... Xu ... ]
7FFFBB63BF00  BD954298    00007F53    BD953D80
  00000000 [.B .... S ... = ... ]
7FFFBB63BF10  BB63BF40    00007FFF    A5927478
  00000084 [@.c ... xt ... ]
7FFFBB63BF20  00000000    00000000    000057C9
  00000000 [ ... W ... ]
7FFFBB63BF30  A5927558    00000084    CA892280
  00007F53 [Xu ... " ... " .... S ... ]
7FFFBB63BF40  BB63C850    00007FFF    03575725
  00000000 [P.c ... % WW ... ]
7FFFBB63BF50  2FBDCC2F    BDAA2C77    00000000
  00000000 [/ ... /w, ... ]
7FFFBB63BF60  00000000    00000001    00000000
  00000000 [ ... ]
7FFFBB63BF70  00000000    00000000    00000000
  00000000 [ ... ]
Repeat 1 times
7FFFBB63BF90  00000000    00000000    03C8AFA4
  00000000 [ ... ]
7FFFBB63BFA0  8E66C8F7    00000054    00000000
  00000000 [ ... ]
7FFFBB63BFB0  0000141C    000DIE99    00069FFA
  00000000 [ ... ]
```

In one embodiment, the metadata extraction policies first determine that there is an error in FRAME 14 due to "ERROR SIGNALED: yes" being present in that frame. For this error type and/or for the information contained in the stack frame and/or the information contained in surrounding stack frames, the metadata extraction policies may further include rules for analyzing the frame that occurs immediately after that frame to determine that the following frame involves the function kkdlgtbz, which is then identified as the source of the error. In this or other examples, the metadata extraction policies may contain rules other than just "next frame after an error" to identify the function of interest on a call stack. For example, the rules may first determine the generic service layer or diagnostic functions that are generally not the functions of interest and then determine, after irrelevant information is excluded, what relevant information remains on the call stack. The metadata extraction policies may indicate that for some errors, the function of interest is going to the caller of a particular layer.

The build label of the third example was formatted similarly to the first example and would involve a similar extraction process, although the delimiters, spacing, and markers may change from example to example and implementation to implementation. In this third example, the output signature may be as follows:

```
{
  "Error": ORA-600
  "Source": kkdlgtbz
  "Label":
     RDBMS_PT.DBCLOUD19_LINUX.X64_230808
}
```

Alternatively or additionally to analyzing information about the particular error itself, additional information relevant to the error may be may be discovered based on a computer system topology. For example, the computer system topology may be used to discover one or more diagnostic files related to the particular error, one or more categories of the error, one or more diagnostic metadata extraction policies for the particular error, and/or one or more logical resources within the one or more diagnostic files. A computer system topology specifies relationships between different logical resources in a computer system, such that some resources "depend on" other resources and may or may not be able operate without them, while other resources "use" or are "used by" other resources, or "store" data for other resources, or "process" data for other resources, or "load balance" for other resources, etc. The computer system topology is accessed to determine a relationship between a first computer system resource identified from the starting set of information and a second computer system resource having a direct or indirect dependency relationship with the first computer system resource in the computer system topology, such as one of the dependency relationships mentioned above. In that manner, data about the second computer system resource may become relevant even if the error was triggered in associated with the first computer system resource. The second computer system resource may be associated with a new diagnostic file, a new category of error, a new metadata extraction policy, or a new logical resource within a diagnostic file being analyzed, for example, by a metadata extraction policy.

In various embodiments, diagnostic metadata extraction policies use a variety of signs from the one or more diagnostic files under analysis in order to identify a potential problem and a potential source of the problem. For example, the diagnostic metadata extraction policy may look for a reference to a process, function, or event that was operating on the computer system to cause the particular problem as the computer system attempted to perform the one or more tasks. Such a function might have been operating to cause a memory leak, assign a mismatched type of value to an object, or never reached an end condition for a loop, for example. policy.

In another example, the diagnostic metadata extraction policy may look for a hardware or software resource having a state that was different from an expected state of the hardware or software resource as the computer system attempted to perform the one or more tasks. The resource could have an "offline" or "busy" state when the resource is expected to be "online" or "free". Such a state mismatch may result in work being sent to the resource even though the resource is not able to handle the work.

In yet another example, the diagnostic metadata extraction policy may look for an external logical resource that is external to the computer system but was in use by the computer system as the computer system attempted to perform the one or more tasks. The resource may have been called from a machine local to the software that encountered the error even though the resource is remote to the software, and this external resource may have been the source of the error if the resource did not respond, respond timely, or provided a response that otherwise did not meet expectations for the external resource.

Alternatively or additionally, the diagnostic metadata extraction policy may look for a storage construct storing one or more particular data values of said data values as the computer system attempted to perform the one or more tasks. For example, the software that encountered the error may have attempted to store a data value that exceeded size limitations for a register, a data block, or another storage construct that is capable of storing data. Alternatively, the storage construct may be storing values that, while technically valid, are unexpected in the given context. For example, a variable for storing an IP address may contain alphabetical characters. The error may have been caused by another incompatibility between the software and the storage construct besides size limitations, such as data type limitations, read/write permissions, or unexpected locks on the storage construct.

In another embodiment, the diagnostic metadata extraction policy may look for one or more referenced logical resources in a section of instructions that were being executed as the computer system attempted to perform the one or more tasks. For example, the diagnostic file may indicate that a set of instructions, such as a class or method or another section of code, was run just before or just as the error occurred, and this section of instructions may be identified as the logical resource that is a source of the problem. As another example, the section of code may output data that is larger, smaller, or of a type different than what is expected from the section of code, and this may cause the section of code to be identified as the source of the problem. The section of code may even be simulated in an isolated environment to determine expected behavior of the code. In one example, the section of instructions may also be a query that was being executed as the computer system attempted to perform the one or more tasks, and the query may have failed to correctly perform the one or more tasks even though the query was predicted to have succeeded. In that scenario and others, the query may be identified as the source of the problem.

In one embodiment, the diagnostic metadata extraction policies use a machine learning model to determine which sequence of extraction steps are needed for which errors. The machine learning model may be trained outside of the access-restricted environment on errors and diagnostic files that occurred elsewhere. Once the steps for extracting metadata relevant to the problem are documented for those errors that occurred elsewhere, those documented steps can be combined with a feature vector that describes characteristics of the error that may be known, such as characteristics that may be fed into the signature generation tool as error metadata. In one embodiment, the error characteristics comprise trace files that may not be identical but are grouped by error along with steps used for one or more of the trace files for extracting metadata. The machine learning model may come up with new extraction rules for identifying similar values in similar but different diagnostic files when the existing extraction rules are insufficient for a given file. Expert users may provide feedback on the machine learning model's performance on identifying correct portions of the diagnostic files that are relevant to the error, and the machine learning model may further take this feedback into account in future steps of identifying relevant portions of diagnostic files.

Once a machine learning model has been trained to look for diagnostic metadata in diagnostic files for a variety of errors, the machine learning model may be sent to the access-restricted environment where the model can be stored and placed in operation. The model can operate in combination with set heuristics in the metadata extraction policies to fill gaps that are not covered by existing heuristics and attempt to find the best possible logical resource to identify as the source of the problem. Feedback can be provided in the diagnostic tool environment even after the model has been copied to the access-restricted environment.

Different software and/or hardware tools may cause different errors, and over time different subsets of the errors that may be caused are known. Once an error is identified and a new pathway to find relevant information in the diagnostic file for the error becomes known, the new pathway may be added to the diagnostic metadata extraction policies so the error may be reliably found in other diagnostic files using the signature generation tool.

Identifying Troubleshooting Components

Using the extracted diagnostic metadata determined in step 114 of FIG. 1, the signature generation tool running in the access-restricted environment determines a problem identifier and a source identifier for the problem in step 116.

In one embodiment, without requiring any additional troubleshooting, the signature generation tool identifies the particular problem and a particular source of the problem, as well as a signature including the particular problem, the particular source, and a version of software for which the particular problem occurred. The particular problem is identified based at least in part on comparing the particular diagnostic metadata to known patterns of diagnostic metadata that are possible for different categories of errors or even specific problems. For example, the diagnostic metadata extraction policies may specify several candidate routes of extracting diagnostic metadata from diagnostic files, and the different routes may branch based on what markers and values are detected in the diagnostic files. Whenever the metadata extraction policies detect an expected pattern of metadata that maps to a potential problem and/or source, possibly including specific known metadata values that uniquely map to the potential problem and/or source, the metadata extraction policies may store that potential problem and/or source as the identified problem and/or source. In one embodiment, diagnostic metadata containing information about certain errors with certain other markers or values extracted from the diagnostic file may indicate a certain problem and source are involved in the error, while other diagnostic metadata with different information about other errors, and/or with different markers or values extracted from the diagnostic files may indicate a different problem and/or source are involved in the error.

The software version may be identified with or without reliance on the extracted diagnostic metadata, in various embodiments. In some embodiments, the software version identifies software for which an error message or other error metadata was collected. In this embodiment, the software version may be retrieved from a software registry in the access-restricted environment, indicating a currently active version of the software associated with the error message. In another embodiment, the error message itself is not uniquely associated with a particular offering of software or a particular package of software installed in the access-restricted environment. In this embodiment, the signature generation tool running in the access-restricted environment may determine which software is most likely associated with the extracted diagnostic metadata before determining the version of the software currently active in the access-restricted environment. The version information may be indicated in the diagnostic files themselves, in a registry of active software in the access-restricted environment, or in a directory associated with the installed software relevant to the extracted diagnostic metadata.

In one embodiment, the signature generation tool running in the access-restricted environment filters out confidential or sensitive information that may be present in information such as the problem identifier or the source identifier to be included in the signature. For example, IP addresses and database names may be masked if they are referenced in the signature as a potential source of the problem.

Various embodiments are disclosed including the troubleshooting components of a problem identifier, a source identifier, and/or a version identifier. Other troubleshooting components may also be included, and troubleshooting components such as the version may be omitted in some embodiments as unnecessary or optional. For example, the version may be known or assumed even without the signature in certain scenarios. The source identifier may be used to identify not just sources within the computer system where the error was detected but also sources outside the computer system, for example, identified using calls to external components. In another example, the source identifier may identify a hash of a subset of the call stack or some other object that can be used to simulate or otherwise troubleshoot a condition of the computer system at the time of the error. In yet another example, the source identifier may identify disassembly instructions that indicate a source associated with the problem. Different applications, databases, middleware, and other software embodiments may have different ways of logging diagnostic information, and, in some embodiments, the signature may include multiple different types of source identifiers that each point to different logical resources contributing to the problem, possibly in different ways.

Outputting the Diagnostic Signature

As shown in FIGS. 1 and 2, the request for a signature starting in steps 108 and 208, respectively, concludes with generation and output of the signature by the access-restricted environment in steps 118 and 218, respectively.

FIGS. 3A-3B and 3D-3F show two different example embodiments of outputting the diagnostic signature from the access-restricted environment for consumption in the diagnostic tool environment.

Figure 3A:
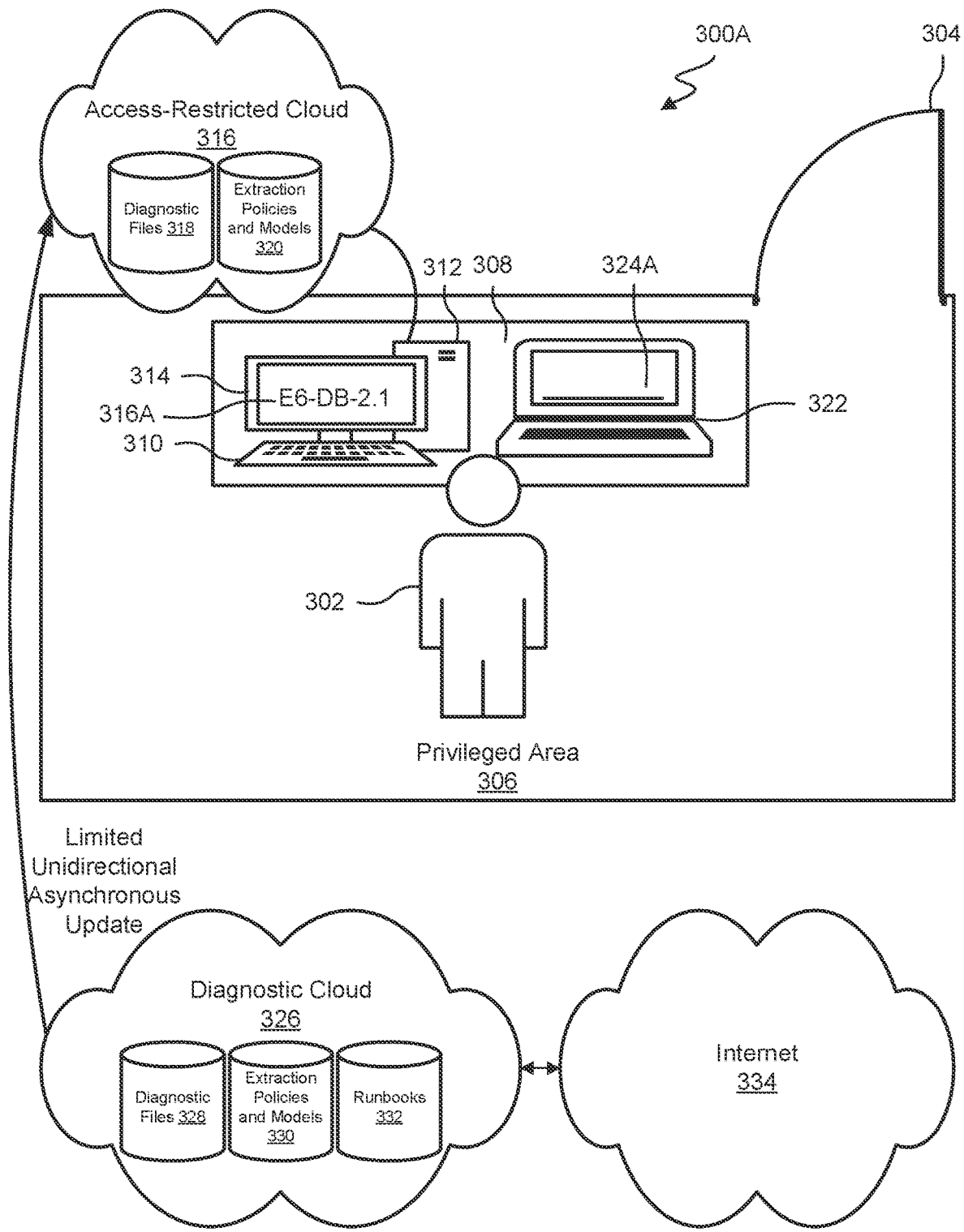
FIGS. 3A-3F show diagrams generating a signature in the access-restricted environment for use in the diagnostic tool environment.
Figure 3B:
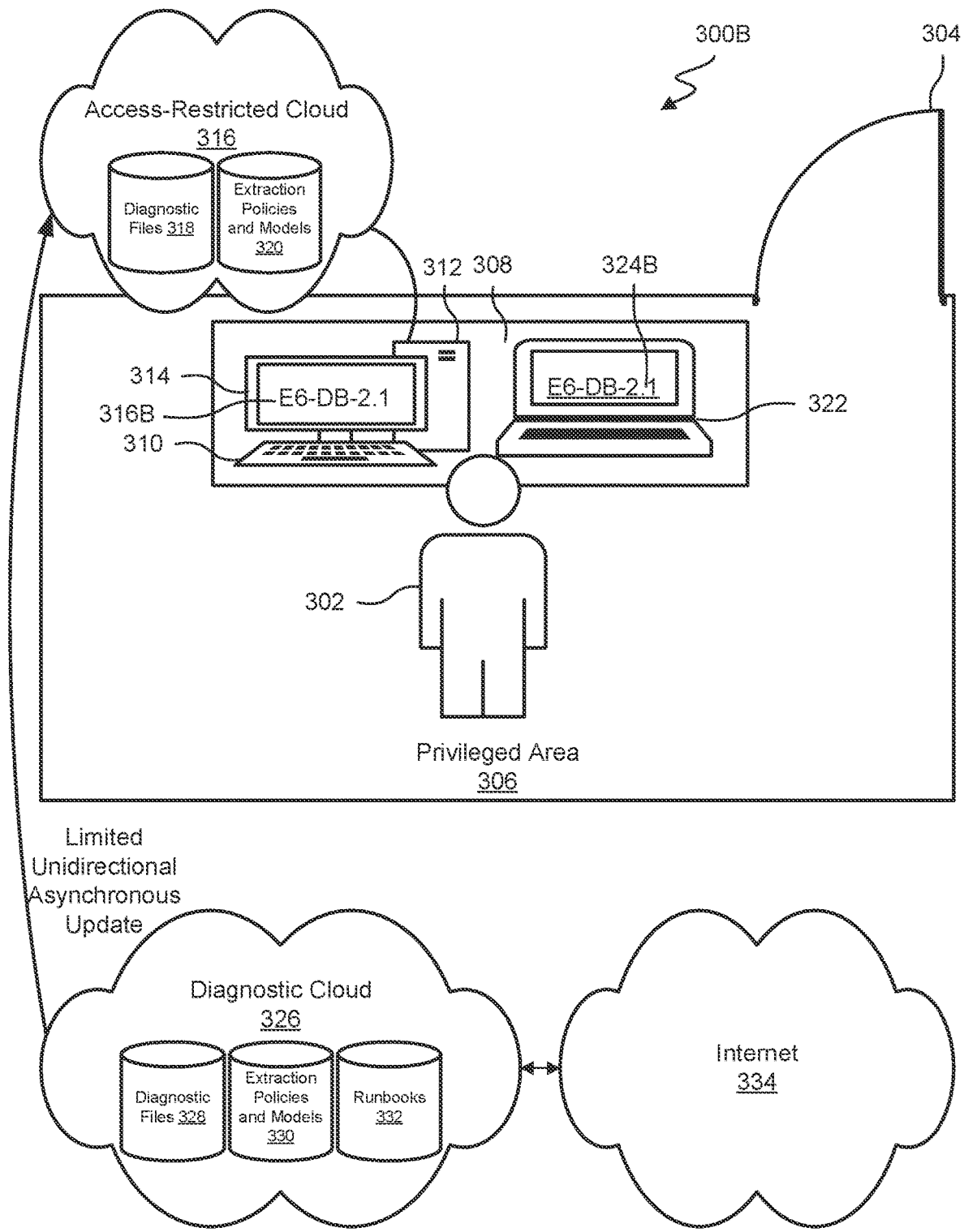

FIGS. 3A and 3B show a text signature 316A and 316B, respectively, displayed on display 314 of machine 312 of access-restricted environment, for example, using a display driver of machine 312 to send an image of the text signature 316A and B, respectively, to be displayed. FIG. 3A shows a blank input region 324A of another machine 322 in the diagnostic tool environment. As shown in FIG. 3B, the text signature 316B is then fed into input region 324B on the other machine 322 in the diagnostic tool environment, allowing the diagnostic tool environment to use components of the text signature 316B to identify a candidate solution to the problem. In the examples shown in FIGS. 3A and 3B, text signature 316A and 316B, respectively, includes 3 parts or troubleshooting components. A first troubleshooting component includes an error identified by an error code "E6". A second troubleshooting component includes a source of the error identified as a "DB" or database logical resource within the computer system. A third troubleshooting component includes a version of the software running at the time of the error, "2.1." In the example, the different troubleshooting components are combined together using delimiters, in this case a single character, "-". Using a short delimiter such as "-" or " " ensures that the text signature 316A and 316B, respectively, can be retyped efficiently in input region 324A and 324B, respectively, by user 302. The delimiter should be chosen such that the delimiter is guaranteed to not be in the troubleshooting components of the signature, such as the problem ID, the source ID, or the software version. In another example (not shown), the signature may be represented in JSON format, which separates key value pairs with a delimiter (":"), such as "problemID": "E6", "sourceID": "DB", "softwareversion": "2.1", which is still compact and allows for more flexible values to be represented.

Figure 3C:
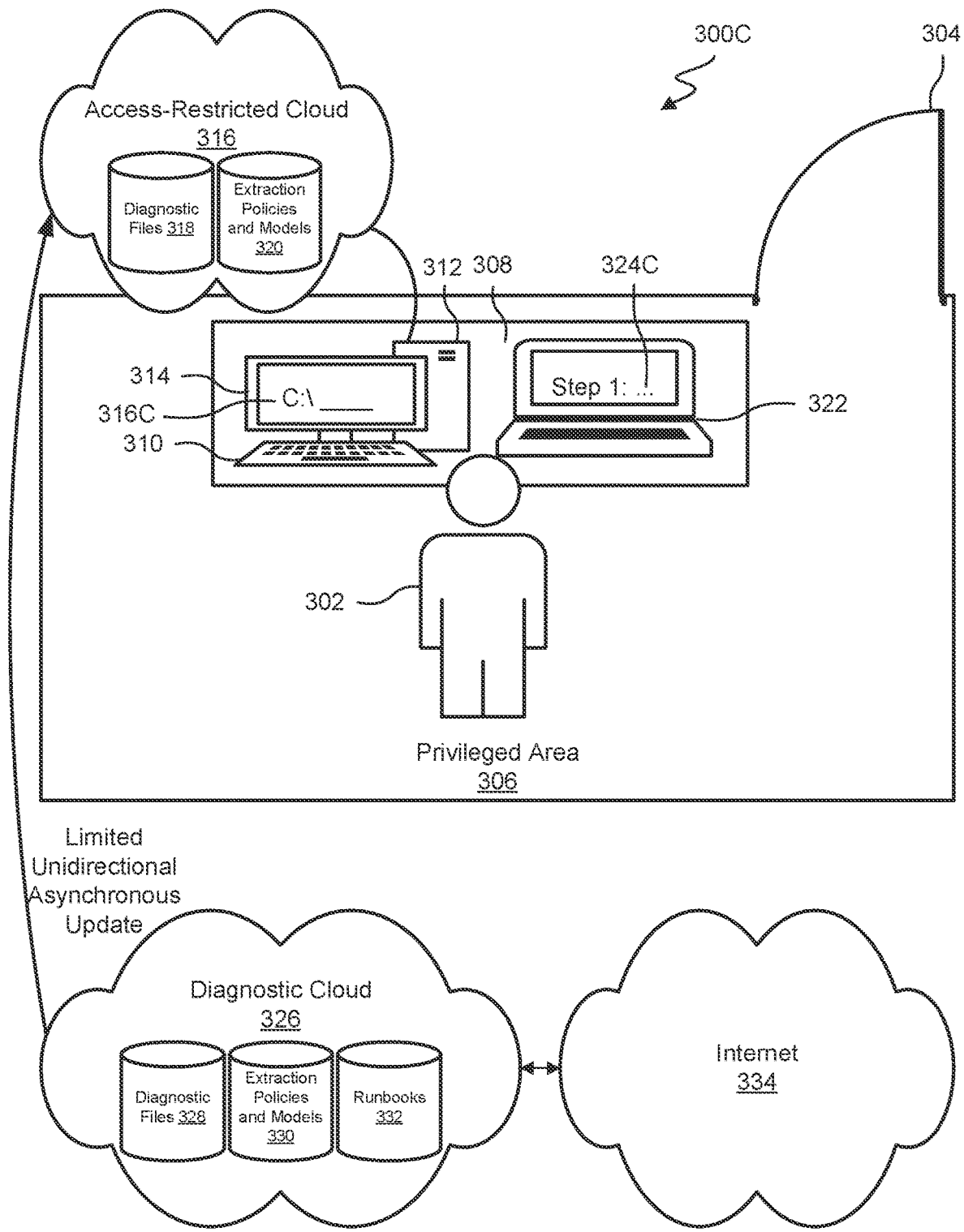
Figure 3D:
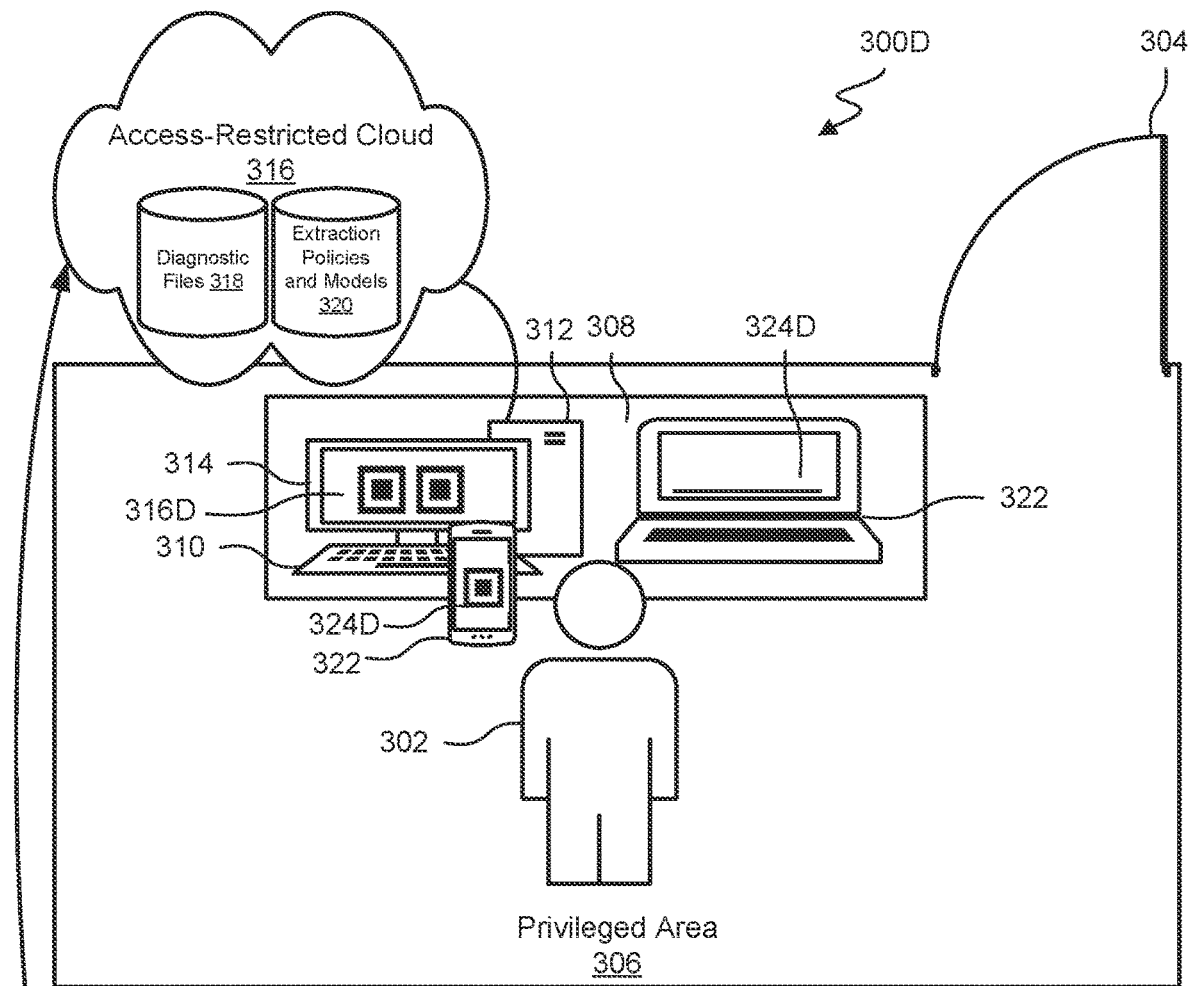
Figure 3D:
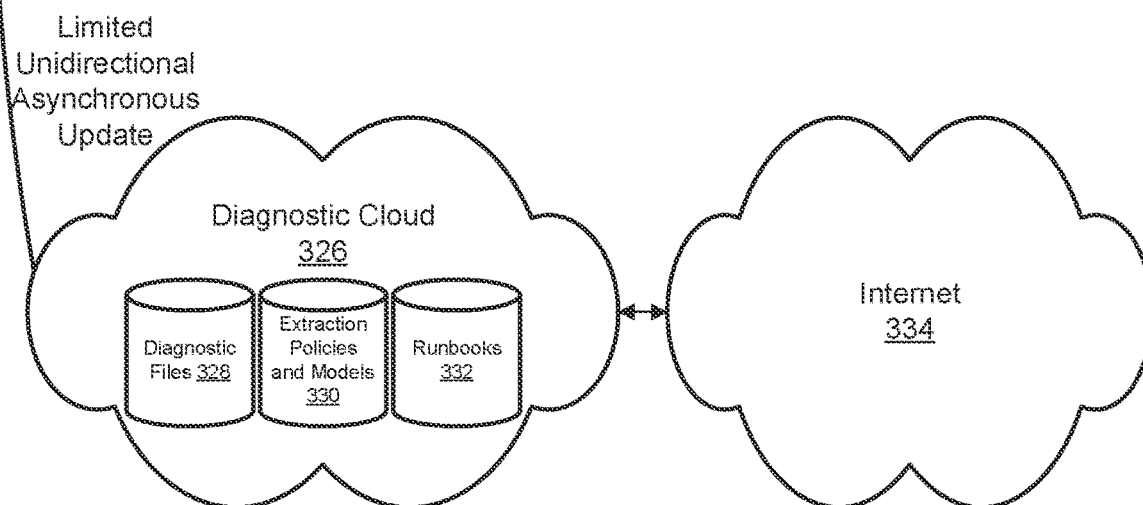
Figure 3E:
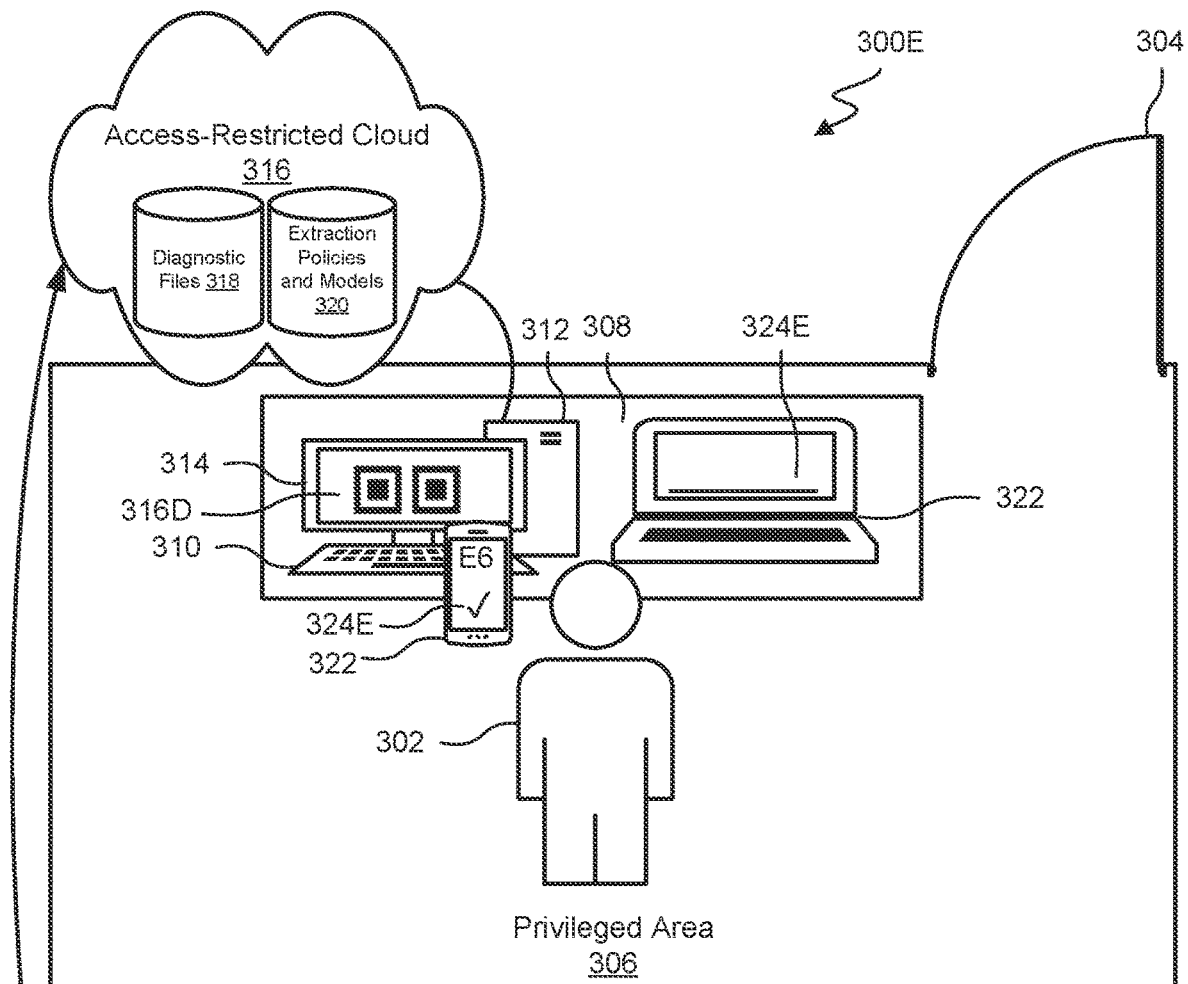
Figure 3E:
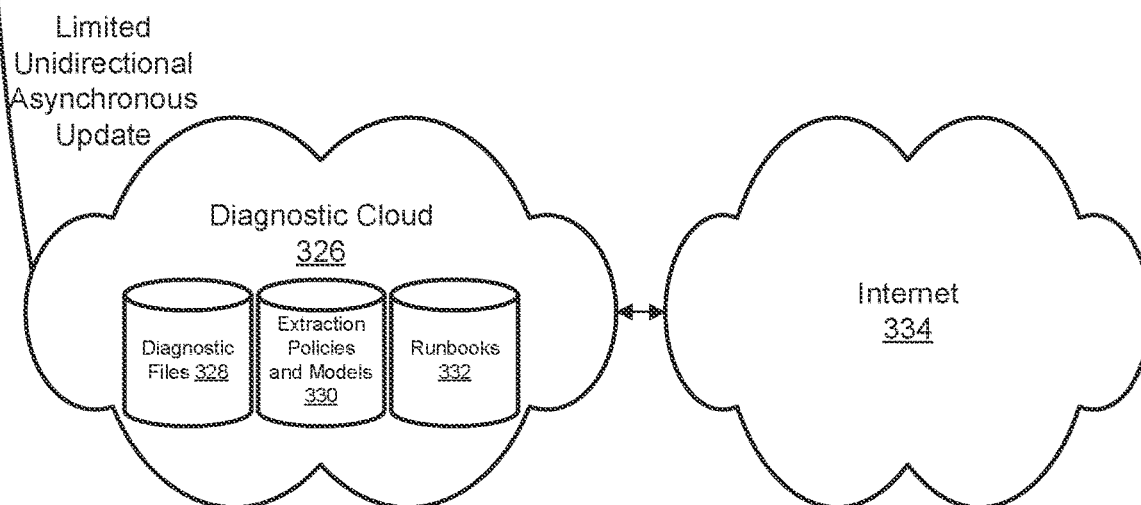
Figure 3F:
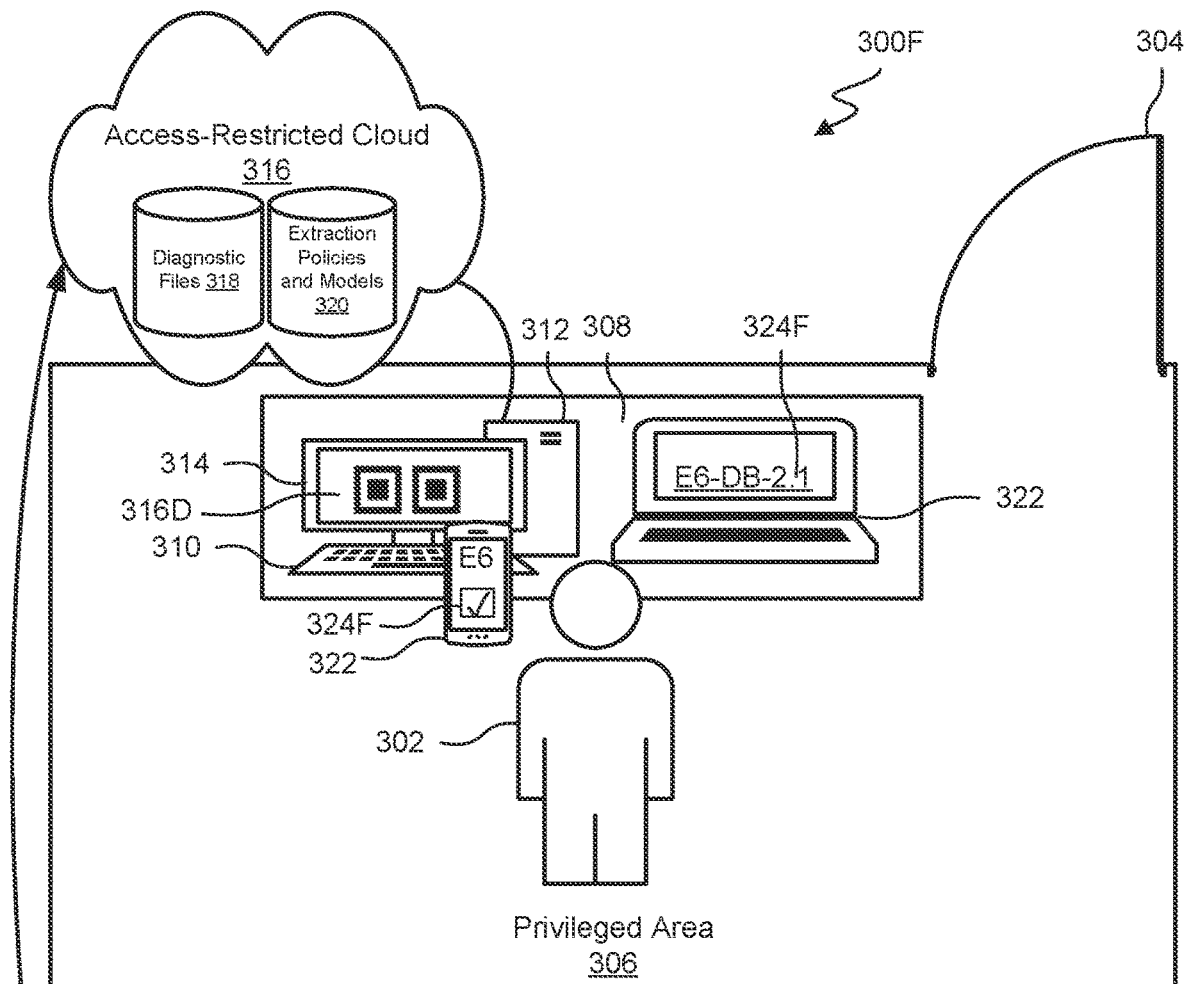
Figure 3F:
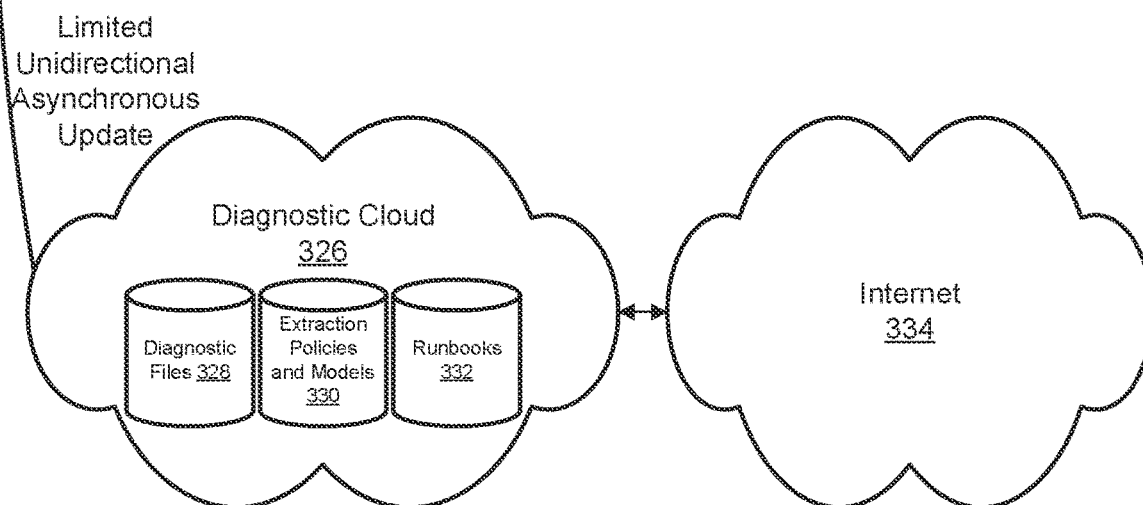

FIGS. 3D-3F show a graphical image 316D, 316E, and 316F, respectively, displayed on display 314 of machine 312 of access restricted environment. In the example, the graphical image 316D, 316E, and 316F, respectively, is a QR code generated by a signature generation tool on machine 312 in the access-restricted environment. FIGS. 3D and 3E show a blank input region 324D of another machine 322 in the diagnostic tool environment for either inputting signature information or displaying information sent to the other machine 322 from image scanner 322. The QR code is deterministically mapped to the text signature in an auditable fashion, such that the QR code can be checked at any time to verify that the QR code uniquely represents the text signature and nothing more or less than the text signature. FIG. 3D shows image scanner 322 for scanning or otherwise capturing graphical image 316D and displaying the scanned graphical image on mobile interface 324D. FIG. 3E further shows an option on mobile interface 324E for confirming a text translation of graphical image 316E is the correct text to send to the other machine 322. This ensures that user 302 retains control over what information is passing out of the access-restricted environment, even though graphical image 316D, 316E, and 316F, respectively, is not human-readable until graphical image 316D, 316E, and 316F, respectively, has been translated by image scanner 322, as shown in FIG. 3D, and confirmed in the human-readable form, as shown on mobile interface 324E of FIG. 3E. The text signature may then be transferred to other machine 322 in the diagnostic tool environment, and be shown in input region 324F or otherwise used by other machine 322 to look up information for solving the problem.

The signature is of a small enough size that it can be written down, typed, or otherwise inputted into the other machine in the diagnostic tool environment within practical time constraints and with practical error expectations. An average typist can type approximately 28 words before experiencing a 90% chance of a typing error, but short social media posts (typically 255 characters or less) are typically manageable even with those errors being corrected. Unlike the words of a social media post, errors in the signature might not be as readily recognized to the user typing the signature. In one embodiment, the signature is 255 characters or less, 150 characters or less, 140 characters (28 words) or less, 100 characters or less, or even 50 or 25 characters or less to ensure that the signature can be practically typed or written down by an average user with few or no errors. If there are errors in the signature, assuming those errors do not map to an alternative signature that communicates different information, the signature with errors can be matched to a closest possible signature in the diagnostic tool environment before searching for a runbook appropriate for solving a problem indicated by the signature.

Using the Troubleshooting Components to Identify a Candidate Solution

Referring to FIGS. 1 and 2, before, after, or during generation of the output signature in steps 118 and 218, respectively, another machine may authenticate the user to the diagnostic tool environment 220. As shown, the access restricted environment is denoted by sides 124 and 224, respectively, and the diagnostic tool environment is denoted by sides 126 and 226, respectively. In FIG. 2, the process continues as the other machine in the diagnostic tool environment receives the input signature in the diagnostic tool in step 222. The process continues as a runbook is located and displayed based on information outside the access-restricted environment in step 228. Similarly, in FIG. 1, the process continues as the other machine receives the input signature and locates a runbook to address the problem in step 122. FIG. 1, which focuses on a signature generation process 100, concludes at step 118 in the access-restricted environment 124 and step 122 in the diagnostic tool environment 126.

In various embodiments, the process interacts with a runbook platform that manages runbooks for troubleshooting errors, and identifying and solving problems. A runbook is a plan for solving or troubleshooting a problem, designed so the plan can be carried out by a user who has minimal familiarity with the problem. The runbook may include steps to perform in the access-restricted environment, variable values to obtain from the access-restricted environment, software changes to make to the access-restricted environment, links to additional information about the error or the problem that caused the error, links to additional information about other problems that may alternatively or additionally be contributing to the problem or causing the error, commands to type into a terminal of the access-restricted environment, configurations to change to software or hardware in the access-restricted environment, and other instructions for solving the problem that potentially led to the error.

In one embodiment, the runbook platform uses errors, underlying problems, and known solutions from multiple tenants to develop a robust set of runbooks that account for a variety of software problems, most of which have been experienced before by at least one tenant. The runbook may guide a user with the wisdom of how the problem was solved for another tenant, without divulging confidential information about the other tenant. Runbooks generated from errors experienced by other tenants may filter out error, problem, or solution information specific to the tenant, so that the user of the runbook is able to learn about the problem and how to solve the problem in the user's target environment.

As shown in FIG. 3C, after the signature transfer process illustrated through FIGS. 3A and 3B, the process illustrated through FIGS. 3D-3F, or another signature transfer process, the other machine 322 has received the signature and successfully found instructions for solving the problem. For example, other machine 322 may communicate with diagnostic cloud 326 to access or search runbooks 332 that may be relevant to the problem. Runbooks 332 may contain different instructions for solving different problems, and runbooks 332 are associated with metadata that describes what problem(s) each runbook of runbooks 332 may be relevant to solve. A search of runbooks 332 may compare problem metadata gleaned from the signature to runbook metadata in order to find a runbook of runbooks 332 that is likely to solve the problem. In another embodiment, runbooks may be stored locally on other machine 322 or accessed from a different remote location via Internet 334. As shown, other machine 322 is showing the instructions on interface 324C so that machine 312 within the access-restricted environment can implement the instructions via interaction with user 302 on interface 316C.

In one embodiment, the other machine in the diagnostic tool environment matches the signature against a problem that requires a patch or software update. The user attending to the access-restricted environment may not have the specific patch or software update to provide at that time. Depending on the restrictions of the access-restricted environment, the user may download the patch from the diagnostic tool environment and provide the patch to an administrator of the access-restricted environment so the patch may be installed in the access-restricted environment. If network accessibility is not available on-site, the user may need to return at another time with the patch on-hand to install in the access-restricted environment.

In a first example, the following signature is input into the diagnostic tool environment, with a "-" delimiting different sections of the signature: ORA7445-psdProcBnd-RDBMS_PT.DBCLOUD19_LINUX.X64_231024

As a result of inputting the signature, the diagnostic tool environment maps the signature to the following expanded problem metadata:
[
{
"bug_num": 123456,
"deploy_labels": [
"RDBMS_PT.DBCLOUD19_LINUX.X64_231024"
],
"bug_prod":
true,
"new_bug_status": "11",
"bug_status": 11,
"bug_subject": "AIM:ORA-7445 [PSDPROCBND]-PSDPROCBND",
"bug_assignee": "JSMITH",
"bug_version": "6.5.4.3.2",
"bug_utility_version": "6.5.4.3.2",
"bug_customer": "ORACLE-AIM",
"tags": "19DBCLOUDPT ADBS_PROD:2 AIM_ADBS_DB_TRK AIM_ADBS_TRK AIM_DB19 AIM_TRK DT_AREA_DICTIONARY
DT RAN REPEAT_COUNT:2 DT_LINK",
"base_bug_num": 123456,
"base_bug_status": 11,
"base_rptdate": "2023 Nov. 27 07:46:36",
"backport_label": " "
}
]

As shown in this example, the expanded problem metadata includes the error name but also a bug number and bug status. In other examples, the error name may be associated with the expanded problem metadata even though it is not contained within the expanded problem metadata. This expanded problem metadata may be fed into a runbook generation system for generating a runbook for troubleshooting an error having this expanded problem metadata. In this example, the runbook may include variable portions that are filled in based on the data contained in the expanded error metadata, and the instructions in the runbook may otherwise reference values pulled from the expanded error metadata. In another example, a generic runbook may be loaded that covers how to troubleshoot the bug identified by the expanded problem metadata, in this case bug 123456. In yet another example, the expanded problem metadata is used to identify solution information from a bug database accessible via the Internet, and the solution information is displayed to the user for troubleshooting the bug.

In a second example, the following signature is input into the diagnostic tool environment, with a "*" delimiting different sections of the signature: ORA-600 [723] *buf_kgcbz2state*RDBMS_PT.DBCLOUD19_LINUX. X64_231024

As a result of inputting the signature, the diagnostic tool environment maps the signature to the following expanded problem metadata:
[
{
"bug_num": 1234568,
"deploy_labels": [
"RDBMS_PT.DBCLOUD19_LINUX.X64_231010",
"RDBMS_PT.DBCLOUD19_LINUX.X64_231024"
],
"bug_prod": true,
"new_bug_status": "11",
"bug_status": 11,
"bug_subject": "AIM:ORA-600-BUF_KGCBZ2STATE",
"bug_assignee": "MJONES",
"bug_version": "8.2.1.0",
"bug_utility_version": "8.2.1.0",
"bug_customer": "ORACLE-AIM",
"tags": "19DBCLOUDPT ADBS_PROD:90 AIM_ADBS_DB_TRK AIM_ADBS_TRK
AIM_DB19 AIM_TRK DT_AREA_DATAPUMP
DT_LINK DT RAN REPEAT_COUNT: 90",
"base_bug_num": 1234568,
"base_bug_status": 11,
"base_rptdate": "2023 Nov. 11 11:16:37",
"backport_label": " "
}
]

As shown in this example, the expanded problem metadata includes the error name but also a bug number and bug status. This expanded problem metadata may be fed into a runbook generation system for generating a runbook for troubleshooting an error having this expanded problem metadata, or a runbook or other instructions otherwise relating to solving bug 1234568.

In a third example, the following signature is input into the diagnostic tool environment:
{
"Error": ORA-600
"Source": kkdlgtbz
"Label": RDBMS_PT.DBCLOUD19_LINUX.X64_230808
}

As a result of inputting the signature, the diagnostic tool environment maps the signature to the following expanded problem metadata:
[
{
"bug_num": 1234570,
"deploy_labels": [
"RDBMS_PT.DBCLOUD19_LINUX.X64_230627",
"RDBMS_PT.DBCLOUD19_LINUX.X64_230711.1",
"RDBMS_PT.DBCLOUD19_LINUX.X64_230725",
"RDBMS_PT.DBCLOUD19_LINUX.X64_230808",
"RDBMS_PT.DBCLOUD19_LINUX.X64_230822",
"RDBMS_PT.DBCLOUD19_LINUX.X64_230613",
"RDBMS_PT.DBCLOUD19_LINUX.X64_230530",
"RDBMS_PT.DBCLOUD19_LINUX.X64_230512"
],
"bug_prod": true,
"bug_status": 11,
"bug_subject": "AIM:ORA-600-KKDLGTBZ",
"bug_assignee": "TWILSON",
"bug_version": "3.2.5.9",
"bug_utility_version": "3.2.5.9",
"bug_customer": "ORACLE-AIM",
"tags": "19DBCLOUDPT ADBS_DB_TRK
ADBS_PREPROD:70 ADBS_PROD:1130
ADBS_TRK AIM_ADBS_DB_TRK
AIM_ADBS_TRK AIM_DB19 AIM_DB_TRK
AIM_TRK DT_LINK DT RAN
REPEAT_COUNT:1200",
"base_bug_num": 1234570,
"base_bug_status": 11,
"base_rptdate": "2023-06-16 13:50:55",
"backport_label": " "
}
]

As shown in this example, the expanded problem metadata includes the error name but also a bug number and bug status. This expanded problem metadata may be fed into a runbook generation system for generating a runbook for troubleshooting an error having this expanded problem metadata, or a runbook or other instructions otherwise relating to solving bug 1234570.

In some scenarios, the diagnostic tool consumes the signature and determines that the error is caused by a problem that is already known to cause errors, but which has not yet been resolved. In this scenario, the diagnostic tool may provide information about the person handling the problem and the status of the problem being resolved. Such information is shown in the examples above as bug_assignee and bug_status.

In a small minority of errors reported to date (for example, less than 5% or even less than 2%), the bug or error is being reported for the first time with no information yet known about the problem. This is particularly rare for Oracle® software, which is stable compared to other enterprise software, and much of which is in use across many different customer sites and has evolved through various versions and iterations over decades. In these scenarios where a new error is being reported, a closest available runbook may be identified, tried, and tested, but the error may still require extensive expert troubleshooting that goes beyond the instructions and expertise reflected in the runbooks. In this scenario, once the problem is resolved, a new runbook is created so other troubleshooting users can solve the problem more efficiently.

Implementing and Testing the Candidate Solution in the Access-Restricted Environment As shown in FIG. 2, a determination is made by the diagnostic tool in step 236 about whether a runbook has been found in step 228. If a runbook is found, the process continues in step 230 to modify the access-restricted environment according to the displayed runbook. Then, in step 232, a test is run in the access-restricted environment according to the displayed runbook to determine if the problem is solved. The determination of whether the problem is resolved is performed in step 234.

In various embodiments, the user may continue to type in commands and make changes to the access-restricted environment, including to the software involved in the error in the access-restricted environment, according to the instructions and guidance provided in the runbooks. After the changes have been made and/or the software has been reconfigured or patched, the user may attempt to replicate the operation that originally resulted in the error to determine if the error is still present. The runbook may include additional instructions for replicating the error to determine if the problem have been truly resolved. If the problem is not yet resolved, the user may continue to try different runbooks and run different tests to see if the other approaches have solved the problem. If none of the proposed solutions work, the user may mark the error as a new error with an unknown problem and solution, and this new error may be the source of additional troubleshooting and runbook generation in the diagnostic tool environment.

Closing Out or Escalating the Error

Referring back to FIG. 2, if the problem is resolved in step 234, the process may proceed to ending as shown. Alternatively, the process may include a step for marking the problem as resolved by closing out the problem in a problem database and/or in a service request database prior to a conclusion of signature consumption process 200.

The process may end with the problem being fully resolved, with the problem partly resolved, or with the problem unresolved. If the problem is unresolved or partly resolved, the user may log additional information that is needed, both in terms of expertise and in terms of diagnostic data, in order to identify a source of the problem and a possible solution to the problem. In some examples, the solution requires a new patch to the software, and the new patch may enter a development cycle with the developers of the software to complete and release.

Computer System Architecture

Figure 4:
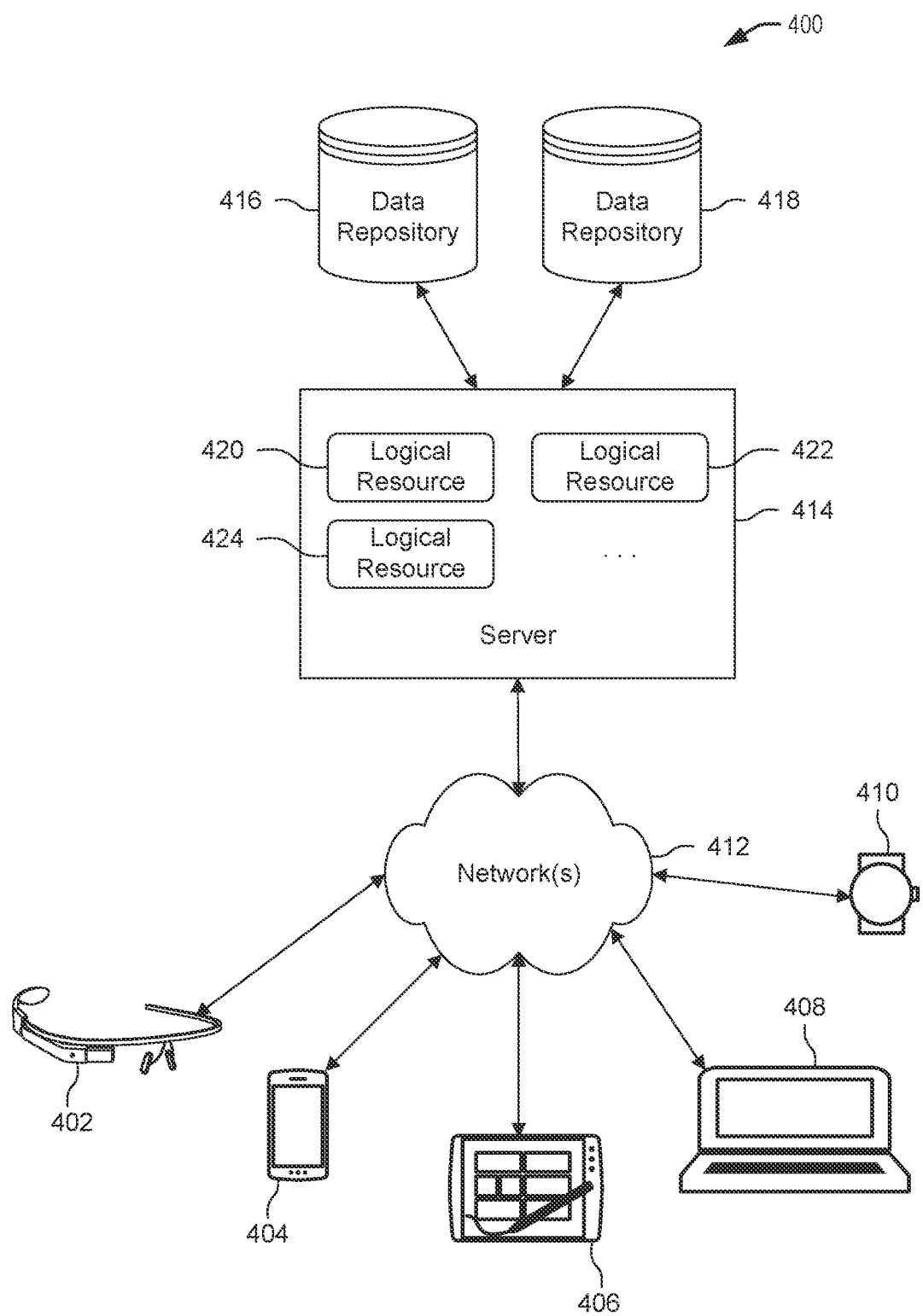
FIG. 4 depicts a simplified diagram of a distributed system for implementing certain aspects.

FIG. 4 depicts a simplified diagram of a distributed system 400 for implementing an embodiment. In the illustrated embodiment, distributed system 400 includes one or more client computing devices 402, 404, 406, 408, and/or 410, coupled to a server 414 via one or more communication networks 412. Clients computing devices 402, 404, 406, 408, and/or 410 and/or server 414 may be configured to execute one or more applications, such as an application that attempts to complete a task but results in an error, an application for generating a signature, an application for troubleshooting a problem, and/or an application for generating a portable pre-trained machine-learning model for extracting metadata.

In certain aspects, server 414 may provide services or software applications that can include non-virtual and virtual environments. In some aspects, these services may be offered as web-based or cloud services, such as under a Software as a Service (SaaS) model to the users of client computing devices 402, 404, 406, 408, and/or 410. In one example, server 414 provides authentication services to one or more client computing devices 402, 404, 406, 408, and/or 410, by checking authentication information provided by the one or more client computing devices 402, 404, 406, 408, and/or 410 against one or more data repositories 416 and/or 418 for verifying whether an authenticating user should have access to an access-restricted environment or a diagnostic tool environment. Users operating client computing devices 402, 404, 406, 408, and/or 410 may utilize one or more client applications to interact with server 414 to utilize the services provided by logical resources 420, 422, and 424 of server 414.

In the configuration depicted in FIG. 4, server 414 may include one or more logical resources 420, 422, and 424 that implement the functions performed by server 414. These logical resources may include logical structures of software, such as separate applications, classes, objects, interfaces, functions, methods, or containers, that may be executed by one or more processors, hardware elements, or combinations thereof. The logical resources may also include any other separately defined or identifiable software or hardware of server 414. Client computing devices 402, 404, 406, 408, and/or 410 may also have logical resources that include any separately defined or identifiable software or hardware of client devices 402, 404, 406, 408, and/or 410, respectively. It should be appreciated that various different system configurations are possible, which may be different from distributed system 400. The embodiment shown in FIG. 4 is thus one example of a distributed system for implementing an embodiment system and is not intended to be limiting. In one embodiment, one version of distributed system 400 is operating in the access-restricted environment, and another version of distributed system 400 is operating in the diagnostic tool environment.

A client device may provide an interface that enables a user of the client device to interact with the client device. The client device may also output information to the user via this interface. Although FIG. 4 depicts only five client computing devices, any number of client computing devices may be supported.

The client devices may include various types of computing systems such as smart phones or other portable handheld devices, general purpose computers such as personal computers and laptops, workstation computers, smart watches, smart glasses, or other wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, Apple® Watch, Meta Quest®, and other devices. Gaming systems may include various handheld gaming devices, Internet-enabled gaming devices (e.g., a Microsoft Xbox® gaming console with or without a Kinect® gesture input device, Sony PlayStation® system, Meta Quest®, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 412 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 412 can be an air-gap network that is isolated from other networks or a network that is connected to the Internet directly or connected to other networks that connect to the Internet, a network internal to the access-restricted environment, a network internal to the diagnostic tool environment, a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 414 may be composed of one or more general purpose computers, specialized server computers (including, by way of example, PC (personal computer) servers, UNIX® servers, mid-range servers, mainframe computers, rack-mounted servers, etc.), server farms, server clusters, a Real Application Cluster (RAC), database servers, or any other appropriate arrangement and/or combination. Server 414 can include one or more virtual machines running virtual operating systems, or other computing architectures involving virtualization such as one or more flexible pools of logical storage devices that can be virtualized to maintain virtual storage devices for the server. In various aspects, server 414 may be adapted to run one or more services or software applications that provide the functionality described in the foregoing disclosure.

The computing systems in server 414 may run one or more operating systems including any of those discussed above, as well as any commercially available server operating system. Server 414 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 414 may include one or more applications to analyze and consolidate data feeds and/or event updates received from users of client computing devices 402, 404, 406, 408, and/or 410. As an example, data feeds and/or event updates may include, but are not limited to, bug feeds, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 414 may also include one or more applications to display the data feeds and/or real-time events via one or more display devices of client computing devices 402, 404, 406, 408, and/or 410.

Distributed system 400 may also include one or more data repositories 416, 418. These data repositories may be used to store data and other information in certain aspects. For example, one or more of the data repositories 416, 418 may be used to store diagnostic files such as trace files, extraction policies, machine-learning models, runbooks, and/or authentication information. Data repositories 416, 418 may reside in a variety of locations. For example, a data repository used by server 414 may be local to server 414 or may be remote from server 414 and in communication with server 414 via a network-based or dedicated connection. Data repositories 416, 418 may be of different types. In certain aspects, a data repository used by server 414 may be a database, for example, a relational database, a container database, an Exadata storage device, or other data storage and retrieval tools such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 416, 418 may also be used by applications to store application data. The data repositories used by applications may be of different types such as, for example, a key-value store repository, an object store repository, or a general storage repository supported by a file system.

In one embodiment, server 414 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

The term cloud service is generally used to refer to a service that is made available to users on demand and via a communication network such as the Internet by systems of a service provider. Typically, in a public cloud environment, servers and systems that make up the cloud service provider's system are different from the client's own on-premise servers and systems. The cloud service provider's systems are managed by the cloud service provider. Clients can thus avail themselves of cloud services provided by a cloud service provider without having to purchase separate licenses, support, or hardware and software resources for the services. For example, a cloud service provider's system may host an application, and a user may, via a network (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as database services, middleware services, application services, and others.

In certain aspects, a cloud infrastructure system may provide one or more cloud services using different models such as under a Software as a Service (SaaS) model, a Platform as a Service (PaaS) model, an Infrastructure as a Service (IaaS) model, and others, including hybrid service models. The cloud infrastructure system may include a suite of databases, middleware, applications, and/or other resources that enable provision of the various cloud services.

A SaaS model enables an application or software to be delivered to a client over a communication network like the Internet, as a service, without the client having to buy the hardware or software for the underlying application. For example, a SaaS model may be used to provide clients access to on-demand applications that are hosted by the cloud infrastructure system. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a client as a cloud service to provide elastic compute and storage capabilities. Various IaaS services are provided by Oracle Corporation®.

A PaaS model is generally used to provide, as a service, platform and environment resources that enable clients to develop, run, and manage applications and services without the client having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

Cloud services are generally provided on an on-demand self-service basis, subscription-based, elastically scalable, reliable, highly available, and secure manner. For example, a client, via a subscription order, may order one or more services provided by the cloud infrastructure system. The cloud infrastructure system then performs processing to provide the services requested in the client's subscription order. The cloud infrastructure system may be configured to provide one or even multiple cloud services.

Errors can occur within a cloud infrastructure system itself, or within computer systems that are consuming the services provided by the cloud infrastructure system. Cloud infrastructure systems can also provide diagnostic services for finding candidate solutions to a problem, or machine learning model generation services for training a model based on available training data. For example, training data about problems and candidate solutions or runbooks may be used to train a model to find candidate solutions for problems that have never before occurred in the same way, with exactly the same error messages, applications, system performance, or metrics involved. The trained model may then be shipped or communicated to another cloud infrastructure site for use in providing machine learning services at that site. For example, a trained model may be shipped to cloud infrastructure within an access-restricted environment for the purpose of extracting diagnostic metadata from diagnostic files such that the extracted diagnostic metadata is relevant to downstream identification of underlying problems.

The cloud infrastructure system may provide services to multiple tenants. For each tenant, the cloud infrastructure system is responsible for managing information related to one or more subscription orders received from the tenant, maintaining tenant data related to the orders, and providing the requested services to the tenant. The cloud infrastructure system may also collect usage statistics regarding a tenant's use of subscribed services. For example, statistics may be collected for the amount of storage used, the amount of data transferred, the number of users, and the amount of system up time and system down time, and the like. This usage information may be used to bill the client. Billing may be done, for example, on a monthly cycle.

The cloud infrastructure system may provide services to multiple tenants in parallel. The cloud infrastructure system may store information for these tenants, including possibly proprietary information. In certain aspects, the cloud infrastructure system comprises an identity management subsystem (IMS) that is configured to manage tenant's information and provide the separation of the managed information such that information related to one tenant is not accessible by another tenant. The IMS may be configured to provide various security-related services such as identity services, such as information access management, authentication and authorization services, services for managing client identities and roles and related capabilities, and the like.

Figure 5:
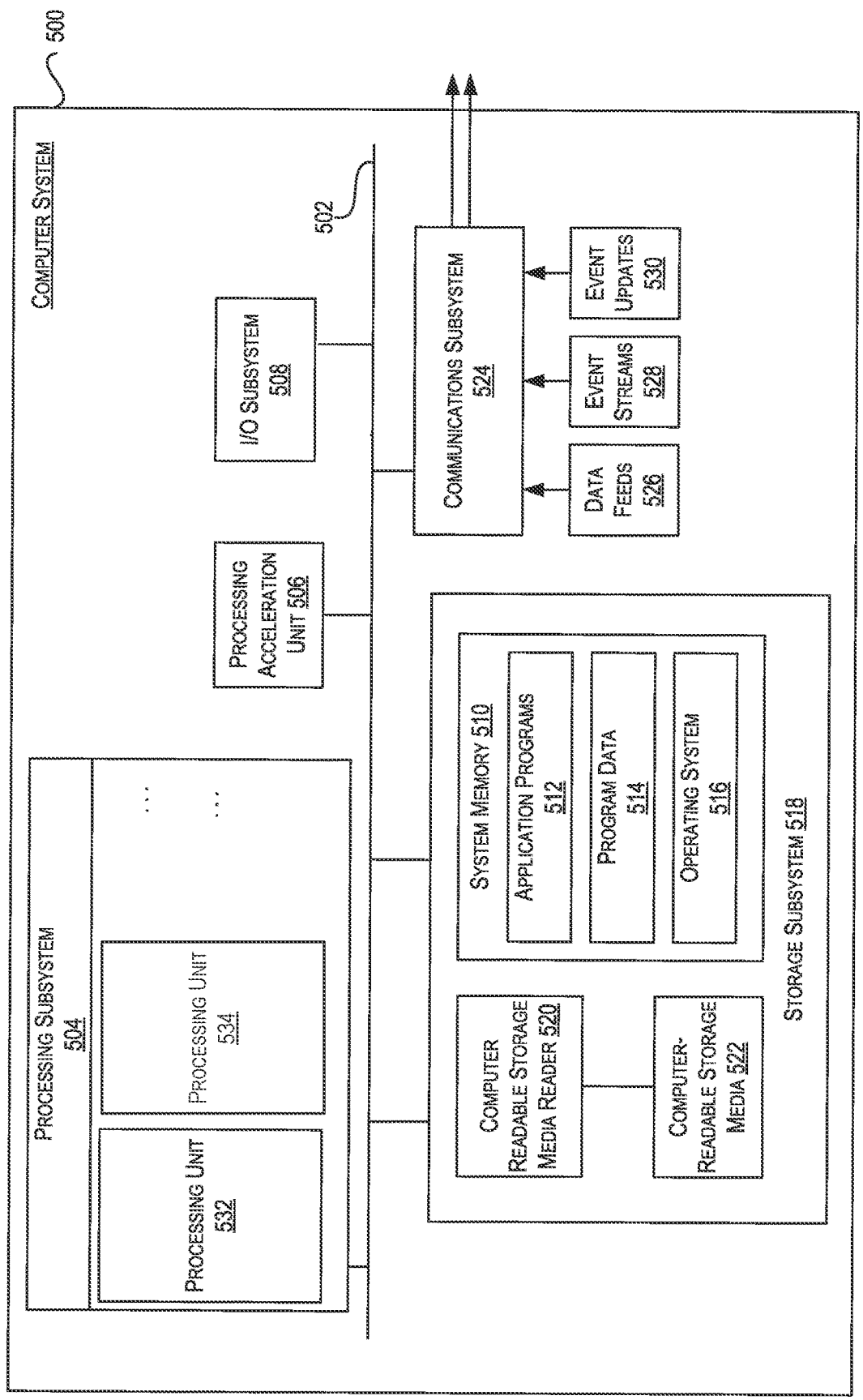
FIG. 5 illustrates an example computer system that may be used to implement certain aspects.

FIG. 5 illustrates an exemplary computer system 500 that may be used to implement certain aspects. For example, in some aspects, computer system 500 may be used to implement the machine 312 or the other machine 322 in any of FIGS. 3A-3F, or access-restricted cloud 316 or diagnostic cloud 326 in any of FIGS. 3A-3F, or any computer system configured to perform any part of signature generation process 100 or any part of signature consumption process 200, or any various server, machine, or computer system embodiments described above. As shown in FIG. 5, computer system 500 includes various subsystems including a processing subsystem 504 that communicates with a number of other subsystems via a bus subsystem 502. These other subsystems may include a processing acceleration unit 506, an I/O subsystem 508, a storage subsystem 518, and a communications subsystem 524. Storage subsystem 518 may include non-transitory computer-readable storage media including storage media 522 and a system memory 510.

Bus subsystem 502 provides a mechanism for letting the various logical resources and subsystems of computer system 500 communicate with each other as intended. Although bus subsystem 502 is shown schematically as a single bus, alternative aspects of the bus subsystem may utilize multiple buses. Bus subsystem 502 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 504 controls the operation of computer system 500 and may comprise one or more processors, application specific integrated circuits (ASICs), or field programmable gate arrays (FPGAs). The processors may include single core or multicore processors. The processing resources of computer system 500 can be organized into one or more processing units 532, 534, etc. A processing unit may include one or more processors, one or more cores from the same or different processors, a combination of cores and processors, or other combinations of cores and processors. In some aspects, processing subsystem 504 can include one or more special purpose co-processors such as graphics processors, digital signal processors (DSPs), or the like. In some aspects, some or all of the processing units of processing subsystem 504 can be implemented using customized circuits, such as application specific integrated circuits (ASICs), or field programmable gate arrays (FPGAs).

In some aspects, the processing units in processing subsystem 504 can execute instructions stored in system memory 510 or on computer readable storage media 522. In various aspects, the processing units can execute a variety of programs or code instructions and can maintain multiple concurrently executing programs or processes. At any given time, some or all of the program code to be executed can be resident in system memory 510 and/or on computer-readable storage media 522 including potentially on one or more storage devices. Through suitable programming, processing subsystem 504 can provide various functionalities described above. In instances where computer system 500 is executing one or more virtual machines, one or more processing units may be allocated to each virtual machine.

In certain aspects, a processing acceleration unit 506 may optionally be provided for performing customized processing or for off-loading some of the processing performed by processing subsystem 504 so as to accelerate the overall processing performed by computer system 500.

I/O subsystem 508 may include devices and mechanisms for inputting information to computer system 500 and/or for outputting information from or via computer system 500. In general, use of the term input device is intended to include all possible types of devices and mechanisms for inputting information to computer system 500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 500 to a user or other computer. User interface output devices may include a display subsystem, indicator lights, or non-visual displays such as audio output devices, etc. The display subsystem may be a flat-panel device, such as that using a light emitting diodes (LEDs), a liquid crystal display (LCD) or plasma display, a projection device, a touch screen, a computer monitor and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 518 provides a repository or data store for storing information and data that is used by computer system 500. Storage subsystem 518 provides a tangible non-transitory computer-readable storage medium for storing the basic programming and data constructs that provide the functionality of some aspects. Storage subsystem 518 may store software (e.g., programs, code modules, instructions) that when executed by processing subsystem 504 provides the functionality described above. The software may be executed by one or more processing units of processing subsystem 504. Storage subsystem 518 may also provide a repository for storing data used in accordance with the teachings of this disclosure.

Storage subsystem 518 may include one or more non-transitory memory devices, including volatile and non-volatile memory devices. As shown in FIG. 5, storage subsystem 518 includes a system memory 510 and a computer-readable storage media 522. System memory 510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 500, such as during start-up, may typically be stored in the ROM. The RAM typically contains data and/or program modules that are presently being operated and executed by processing subsystem 504. In some implementations, system memory 510 may include multiple different types of memory, such as static random access memory (SRAM), dynamic random access memory (DRAM), and the like.

By way of example, and not limitation, as depicted in FIG. 5, system memory 510 may load application programs 512 that are being executed, which may include various applications such as Web browsers, mid-tier applications, relational database management systems (RDBMS), etc., program data 514, and an operating system 516. By way of example, operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 522 may store programming and data constructs that provide the functionality of some aspects. Computer-readable media 522 may provide storage of computer-readable instructions, data structures, program modules, and other data for computer system 500. Software (programs, code modules, instructions) that, when executed by processing subsystem 504 provides the functionality described above, may be stored in storage subsystem 518. By way of example, computer-readable storage media 522 may include non-volatile memory such as a hard disk drive, a magnetic disk drive, an optical disk drive such as a CD ROM, digital video disc (DVD), a Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 518 may also include a computer-readable storage media reader 520 that can further be connected to computer-readable storage media 522. Reader 520 may receive and be configured to read data from a memory device such as a disk, a flash drive, etc.

In certain aspects, computer system 500 may support virtualization technologies, including but not limited to virtualization of processing and memory resources. For example, computer system 500 may provide support for executing one or more virtual machines. In certain aspects, computer system 500 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 500. Accordingly, multiple operating systems may potentially be run concurrently by computer system 500.

Communications subsystem 524 provides an interface to other computer systems and networks. Communications subsystem 524 serves as an interface for receiving data from and transmitting data to other systems from computer system 500. For example, communications subsystem 524 may enable computer system 500 to establish a communication channel to one or more client devices via the Internet for receiving and sending information from and to the client devices. For example, the communication subsystem may be used to transmit a response to a user regarding the inquiry for a Chabot.

Communication subsystem 524 may support both wired and/or wireless communication protocols. For example, in certain aspects, communications subsystem 524 may include radio frequency (RF) transceiver element for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver element, and/or other logical resources. In some aspects communications subsystem 524 can provide wired network connectivity (e.g., Ethernet) in addition to or instead of a wireless interface.

Communication subsystem 524 can receive and transmit data in various forms. For example, in some aspects, in addition to other forms, communications subsystem 524 may receive input communications in the form of structured and/or unstructured data feeds 526, event streams 528, event updates 530, and the like. For example, communications subsystem 524 may be configured to receive (or send) data feeds 526 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 524 may be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to communicate data from computer system 500 to other computer systems or networks. The data may be communicated in various different forms such as structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 500 depicted in FIG. 5 is intended only as a specific example. Many other configurations having more or fewer logical resources than the system depicted in FIG. 5 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, logical resources or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
   storing a plurality of diagnostic files as a computer system attempts to perform a plurality of different tasks in an access-restricted environment, wherein the plurality of diagnostic files comprise diagnostic metadata, the diagnostic metadata comprising:
      identifiers of a plurality of logical resources in use by the computer system as the computer system attempts to perform the plurality of different tasks; and
      data values associated with logical resources of the plurality of logical resources as the computer system attempts to perform the plurality of different tasks;
   wherein a particular problem prevents the computer system from correctly performing one or more tasks of the plurality of different tasks;
   on a machine in the access-restricted environment, authenticating a user to the access-restricted environment, wherein the access-restricted environment is restricted from communicating information over any computer network to a separate diagnostic tool environment that is also accessible to the user;
   in the access-restricted environment:
      receiving error metadata that identifies a starting set of information in the access-restricted environment for troubleshooting a particular error resulting from the particular problem, wherein the error metadata, without analysis of the starting set of information in the access-restricted environment, does not reveal which problem of at least two different candidate problems of a plurality of different candidate problems resulted in the particular error; and
      initiating a signature generation mode using the starting set of information, and, in the signature generation mode without requiring any additional troubleshooting from the user:
         based at least in part on the starting set of information:
            accessing, from the plurality of diagnostic files, one or more particular diagnostic files potentially relevant to the particular error; and
            selecting one or more particular categories of the particular error from a plurality of candidate categories of errors;
         based at least in part on the selected one or more particular categories of the particular error, selecting one or more diagnostic metadata extraction policies from a plurality of different candidate diagnostic metadata extraction policies managed in the access-restricted environment;
         applying the one or more diagnostic metadata extraction policies to extract, from the one or more particular diagnostic files, particular diagnostic metadata specific to the selected one or more particular categories of the particular error, the particular diagnostic metadata identifying one or more particular logical resources of a plurality of particular logical resources in the one or more particular diagnostic files;
         identifying the particular problem from the plurality of different candidate problems based at least in part on comparing the particular diagnostic metadata to known patterns of diagnostic metadata for at least one of said at least two different candidate problems, wherein the plurality of different candidate problems comprise said at least two different candidate problems and one or more other candidate problems that, if present, would result in a different error other than the particular error;
         identifying a particular source of the particular problem from a plurality of different candidate sources of the particular problem based at least in part on the one or more particular logical resources identified by the particular diagnostic metadata; and
         generating a signature for the particular problem, wherein the signature comprises human-readable text, the human-readable text comprising:
            a problem identifier that identifies the particular problem from the plurality of different candidate problems, and
            a source identifier that identifies the particular source from the plurality of different candidate sources; and
      causing display of the signature, wherein the signature is consumable by a diagnostic interface in the separate diagnostic tool environment.

2. The computer-implemented method of claim 1, wherein the access-restricted environment comprises an air-gapped network, wherein the diagnostic interface is provided by another machine in the separate diagnostic tool environment that is not in the air-gapped network, the computer-implemented method of claim 1 further comprising:

on the other machine in the separate diagnostic tool environment, authenticating the user to the separate diagnostic tool environment such that the user remains authenticated to the access-restricted environment and to the separate diagnostic tool environment at a same time.

3. The computer-implemented method of claim 1, wherein receiving the error metadata comprises receiving input to the machine from the user, and wherein the input identifies a first diagnostic file; wherein said accessing the one or more particular diagnostic files potentially relevant to the particular error comprises identifying one or more diagnostic files other than the first diagnostic file based at least in part on analyzing information about the particular error from the first diagnostic file.

4. The computer-implemented method of claim 1, further comprising discovering additional information relevant to the particular error based at least in part on accessing a computer system topology to determine a relationship between a first computer system resource identified from the starting set of information and a second computer system resource having a direct or indirect dependency relationship with the first computer system resource in the computer system topology.

5. The computer-implemented method of claim 1, wherein the one or more diagnostic metadata extraction policies comprise instructions for locating a first marker within a given diagnostic file, wherein said applying the one or more diagnostic metadata extraction policies to extract, from the one or more particular diagnostic files, the particular diagnostic metadata specific to the selected one or more particular categories of the particular error comprises locating the first marker in the one or more particular diagnostic files, wherein one or more other diagnostic metadata extraction policies not selected for the one or more particular categories of the particular error comprise other instructions for locating a second marker within a given diagnostic file, wherein the second marker is different than the first marker;

wherein the particular diagnostic metadata is identified for extraction based at least in part on a location, within the one or more particular diagnostic files, of the particular diagnostic metadata relative to a location of the first marker.

6. The computer-implemented method of claim 1, further comprising receiving and storing, within the access-restricted environment, a machine learning model trained outside the access-restricted environment on diagnostic metadata that is relevant to errors that occurred on other computer systems outside the access-restricted environment to identify problems on the other computer systems outside the access-restricted environment, wherein the one or more metadata extraction policies are defined or selected based at least in part on the machine learning model determining which diagnostic metadata is relevant to which categories of errors to identify which problems.

7. The computer-implemented method of claim 1, wherein the one or more particular logical resources identified by the particular metadata and used to identify the particular source include one or more of:

a process, function, or event that was operating on the computer system to cause the particular problem as the computer system attempted to perform the one or more tasks, a hardware or software resource having a state that was different from an expected state of the hardware or software resource as the computer system attempted to perform the one or more tasks, an external logical resource that is external to the computer system but was in use by the computer system as the computer system attempted to perform the one or more tasks, a storage construct storing one or more particular data values of said data values as the computer system attempted to perform the one or more tasks, a storage construct attempting to store incompatible data values of said data values as the computer system attempted to perform the one or more tasks, one or more referenced logical resources in a section of instructions that were being executed as the computer system attempted to perform the one or more tasks, one or more sections of instructions that were simulated to not correctly perform the one or more tasks that the computer system attempted to perform, or one or more query execution resources that were being used to execute one or more queries as the computer system attempted to perform the one or more tasks, wherein the one or more queries were otherwise predicted to correctly perform the one or more tasks.

8. The computer-implemented method of claim 1, further comprising:

in the separate diagnostic tool environment, receiving the human-readable text;

in response to said receiving the human-readable text, communicating with a cloud diagnostic system to identify a runbook for addressing the particular problem, wherein the runbook comprises instructions to be performed in the access-restricted environment for addressing the particular problem; and causing display, by the diagnostic interface in the separate diagnostic tool environment, of the runbook.

9. The computer-implemented method of claim 1, further comprising:

on the machine in the access-restricted environment, causing display of a graphical image that is deterministically mapped to the signature but for which the problem identifier, the source identifier, and a version of software for which the particular problem occurred are not in human-readable text;

capturing the graphical image on an image reader device that is separate from the machine;

translating the graphical image into the human-readable text; and inputting the signature into the diagnostic interface in the separate diagnostic tool environment;

wherein said causing display of the signature is performed after said translating the graphical image into the human-readable text.

10. One or more non-transitory computer-readable media storing instructions which, when executed by one or more processors, cause:

storing a plurality of diagnostic files as a computer system attempts to perform a plurality of different tasks in an access-restricted environment, wherein the plurality of diagnostic files comprise diagnostic metadata, the diagnostic metadata comprising:

identifiers of a plurality of logical resources in use by the computer system as a result of the computer system attempting to perform the plurality of different tasks; and data values associated with logical resources of the plurality of logical resources as the computer system attempts to perform the plurality of different tasks;

wherein a particular problem prevents the computer system from correctly performing one or more tasks of the plurality of different tasks;

on a machine in the access-restricted environment, authenticating a user to the access-restricted environment, wherein the access-restricted environment is restricted from communicating information over any computer network to a separate diagnostic tool environment that is also accessible to the user;

in the access-restricted environment:

receiving error metadata that identifies a starting set of information in the access-restricted environment for troubleshooting a particular error resulting from the particular problem, wherein the error metadata, without analysis of the starting set of information in the access-restricted environment, does not reveal which problem of at least two different candidate problems of a plurality of different candidate problems resulted in the particular error; and initiating a signature generation mode using the starting set of information, and, in the signature generation mode without requiring any additional troubleshooting from the user:

based at least in part on the starting set of information:

accessing, from the plurality of diagnostic files, one or more particular diagnostic files potentially relevant to the particular error;

selecting one or more particular categories of the particular error from a plurality of candidate categories of errors;

based at least in part on the selected one or more particular categories of the particular error, selecting one or more diagnostic metadata extraction policies from a plurality of different candidate diagnostic metadata extraction policies managed in the access-restricted environment;

applying the one or more diagnostic metadata extraction policies to extract, from the one or more particular diagnostic files, particular diagnostic metadata specific to the selected one or more particular categories of the particular error, the particular diagnostic metadata identifying one or more particular logical resources of a plurality of particular logical resources in the one or more particular diagnostic files;

identifying the particular problem from the plurality of different candidate problems based at least in part on comparing the particular diagnostic metadata to known patterns of diagnostic metadata for at least one of said at least two different candidate problems, wherein the plurality of different candidate problems comprise said at least two different candidate problems and one or more other candidate problems that, if present, would result in a different error other than the particular error;

identifying a particular source of the particular problem from a plurality of different candidate sources of the particular problem based at least in part on the one or more particular logical resources identified by the particular diagnostic metadata; and generating a signature for the particular problem, wherein the signature comprises human-readable text, the human-readable text comprising:

a problem identifier that identifies the particular problem from the plurality of different candidate problems, and a source identifier that identifies the particular source from the plurality of different candidate sources; and causing display of the signature, wherein the signature is consumable by a diagnostic interface in the separate diagnostic tool environment.

11. The one or more non-transitory computer-readable media of claim 10, wherein the instructions, when executed by the one or more processors, cause receiving the error metadata at least in part by receiving input to the machine from the user, wherein the input identifies a first diagnostic file; and wherein the stored instructions, when executed by one or more processors, cause accessing the one or more particular diagnostic files potentially relevant to the particular error at least in part by identifying one or more diagnostic files other than the first diagnostic file based at least in part on analyzing information about the particular error from the first diagnostic file.

12. The one or more non-transitory computer-readable media of claim 10, wherein the instructions, when executed by the one or more processors, further cause discovering additional information relevant to the particular error based at least in part on accessing a computer system topology to determine a relationship between a first computer system resource identified from the starting set of information and a second computer system resource having a direct or indirect dependency relationship with the first computer system resource in the computer system topology.

13. The one or more non-transitory computer-readable media of claim 10, wherein the one or more diagnostic metadata extraction policies comprise instructions for locating a first marker within a given diagnostic file, wherein the instructions, when executed by the one or more processors, cause said applying the one or more diagnostic metadata extraction policies to extract, from the one or more particular diagnostic files, the particular diagnostic metadata specific to the selected one or more particular categories of the particular error at least in part by locating the first marker in the one or more particular diagnostic files; wherein one or more other diagnostic metadata extraction policies not selected for the one or more particular categories of the particular error comprise other instructions for locating a second marker within a given diagnostic file, wherein the second marker is different than the first marker;

wherein the instructions, when executed by the one or more processors, cause identifying the particular diagnostic metadata for extraction based at least in part on a location, within the one or more particular diagnostic files, of the particular diagnostic metadata relative to a location of the first marker.

14. The one or more non-transitory computer-readable media of claim 10, wherein the one or more particular logical resources identified by the particular metadata and used to identify the particular source include one or more of:

a process, function, or event that was operating on the computer system to cause the particular problem as the computer system attempted to perform the one or more tasks, a hardware or software resource having a state that was different from an expected state of the hardware or software resource as the computer system attempted to perform the one or more tasks, an external logical resource that is external to the computer system but was in use by the computer system as the computer system attempted to perform the one or more tasks,
a storage construct storing one or more particular data values of said data values as the computer system attempted to perform the one or more tasks,
a storage construct attempting to store incompatible data values of said data values as the computer system attempted to perform the one or more tasks,
one or more referenced logical resources in a section of instructions that were being executed as the computer system attempted to perform the one or more tasks,
one or more sections of instructions that were simulated to not correctly perform the one or more tasks that the computer system attempted to perform, or
one or more query execution resources that were being used to execute one or more queries as the computer system attempted to perform the one or more tasks, wherein the one or more queries were otherwise predicted to correctly perform the one or more tasks.

15. A machine in an access-restricted environment, the machine comprising:
a diagnostic file repository in the access-restricted environment, the diagnostic file repository configured to store a plurality of diagnostic files as a computer system attempts to perform a plurality of different tasks in an access-restricted environment, wherein the plurality of diagnostic files comprise diagnostic metadata, the diagnostic metadata comprising:
identifiers of a plurality of logical resources in use by the computer system as the computer system attempts to perform the plurality of different tasks; and
data values associated with logical resources of the plurality of logical resources as the computer system attempts to perform the plurality of different tasks;
wherein a particular problem prevents the computer system from correctly performing one or more tasks of the plurality of different tasks;
an authentication mechanism in the access-restricted environment, the authentication mechanism configured to authenticate a user to the access-restricted environment, wherein the access-restricted environment is restricted from communicating information over any computer network to a separate diagnostic tool environment that is also accessible to the user;
a signature generation tool in the access-restricted environment, the signature generation tool, when activated, configured to:
receive error metadata that identifies a starting set of information in the access-restricted environment for troubleshooting a particular error resulting from the particular problem, wherein the error metadata, without analysis of the starting set of information in the access-restricted environment, does not reveal which problem of at least two different candidate problems of a plurality of different candidate problems resulted in the particular error; and
initiate a signature generation mode using the starting set of information, and, in the signature generation mode without requiring any additional troubleshooting from the user, based at least in part on the starting set of information:
access, from the plurality of diagnostic files, one or more particular diagnostic files potentially relevant to the particular error;
select one or more particular categories of the particular error from a plurality of candidate categories of errors;
based at least in part on the selected one or more particular categories of the particular error, select one or more diagnostic metadata extraction policies from a plurality of different candidate diagnostic metadata extraction policies managed in the access-restricted environment;
apply the one or more diagnostic metadata extraction policies to extract, from the one or more particular diagnostic files, particular diagnostic metadata specific to the selected one or more particular categories of the particular error, the particular diagnostic metadata identifying one or more particular logical resources of a plurality of particular logical resources in the one or more particular diagnostic files;
identify the particular problem from the plurality of different candidate problems based at least in part on comparing the particular diagnostic metadata to known patterns of diagnostic metadata for at least one of said at least two different candidate problems, wherein the plurality of different candidate problems comprise said at least two different candidate problems and one or more other candidate problems that, if present, would result in a different error other than the particular error;
identify a particular source of the particular problem from a plurality of different candidate sources of the particular problem based at least in part on the one or more particular logical resources identified by the particular diagnostic metadata; and
generate a signature for the particular problem, wherein the signature comprises human-readable text, the human-readable text comprising:
a problem identifier that identifies the particular problem from the plurality of different candidate problems, and
a source identifier that identifies the particular source from the plurality of different candidate sources; and
a display driver configured to cause display, on a display, of the signature, wherein the signature is consumable by a diagnostic interface in the separate diagnostic tool environment.

16. The machine of claim 15, wherein the access-restricted environment comprises an air-gapped network, wherein the diagnostic interface is provided by another machine in the separate diagnostic tool environment that is not in the air-gapped network and is not connected to the machine, and wherein the machine and the other machine allow the user to remain authenticated to the access-restricted environment and to the separate diagnostic tool environment at a same time so the signature may be consumed in the diagnostic tool environment.

17. The machine of claim 15, wherein the signature generation tool, when activated, is configured to receive the error metadata at least in part by receiving input to the machine from the user, and wherein the input identifies a first diagnostic file; wherein the signature generation tool accesses the one or more particular diagnostic files potentially relevant to the particular error at least in part by identifying one or more diagnostic files other than the first diagnostic file based at least in part on analyzing information about the particular error from the first diagnostic file.

18. The machine of claim 15, wherein the signature generation tool, when activated, is configured to discover additional information relevant to the particular error based at least in part on accessing a computer system topology to determine a relationship between a first computer system resource identified from the starting set of information and a second computer system resource having a direct or indirect dependency relationship with the first computer system resource in the computer system topology.

19. The machine of claim 15, wherein the one or more diagnostic metadata extraction policies comprise instructions for locating a first marker within a given diagnostic file, wherein the signature generation tool applies the one or more diagnostic metadata extraction policies to extract, from the one or more particular diagnostic files, the particular diagnostic metadata specific to the selected one or more particular categories of the particular error at least in part by locating the first marker in the one or more particular diagnostic files, wherein one or more other diagnostic metadata extraction policies not selected for the one or more particular categories of the particular error comprise other instructions for locating a second marker within a given diagnostic file, wherein the second marker is different than the first marker;

wherein the signature generation tool identifies the particular diagnostic metadata for extraction based at least in part on a location, within the one or more particular diagnostic files, of the particular diagnostic metadata relative to a location of the first marker.

20. The machine of claim 15, wherein the one or more particular logical resources identified by the particular metadata and used to identify the particular source include one or more of:

a process, function, or event that was operating on the computer system to cause the particular problem as the computer system attempted to perform the one or more tasks, a hardware or software resource having a state that was different from an expected state of the hardware or software resource as the computer system attempted to perform the one or more tasks, an external logical resource that is external to the computer system but was in use by the computer system as the computer system attempted to perform the one or more tasks, a storage construct storing one or more particular data values of said data values as the computer system attempted to perform the one or more tasks, a storage construct attempting to store incompatible data values of said data values as the computer system attempted to perform the one or more tasks, one or more referenced logical resources in a section of instructions that were being executed as the computer system attempted to perform the one or more tasks, one or more sections of instructions that were simulated to not correctly perform the one or more tasks that the computer system attempted to perform, or one or more query execution resources that were being used to execute one or more queries as the computer system attempted to perform the one or more tasks, wherein the one or more queries were otherwise predicted to correctly perform the one or more tasks.

* * * * *